United States Patent [19]

Onishi et al.

[11] Patent Number: 4,469,054
[45] Date of Patent: Sep. 4, 1984

[54] TWO-STROKE INTERNAL-COMBUSTION ENGINE

[75] Inventors: Sigeru Onishi, Kanazawa; Souk H. Jo, Tokyo; Pan D. Jo, Kanazawa; Satoshi Kato, Ishikawa, all of Japan

[73] Assignee: Nippon Clean Engine Research Institute Co., Ltd., Kanazawa, Japan

[21] Appl. No.: 516,871

[22] Filed: Jul. 25, 1983

[30] Foreign Application Priority Data

May 19, 1983 [JP] Japan ................... 58-088079

[51] Int. Cl.³ .............. F02B 33/04; F02B 33/14; F02B 25/20; F24B 13/04
[52] U.S. Cl. .................. 123/73 R; 123/73 A; 123/74 R; 123/430; 123/DIG. 4
[58] Field of Search ............ 123/73 R, 73 A, 74 R, 123/74 A, DIG. 4, 430

[56] References Cited

U.S. PATENT DOCUMENTS

| Re. 27,367 | 5/1972 | Von Seggern | 123/DIG. 4 |
|---|---|---|---|
| 3,916,851 | 11/1975 | Otani | 123/73 A |
| 3,923,019 | 12/1975 | Yamada | 123/73 R X |
| 3,934,562 | 1/1976 | Isaka | 123/DIG. 4 |
| 4,248,185 | 2/1981 | Saulmes | 123/73 R |
| 4,253,433 | 3/1981 | Blair | 123/73 R |

FOREIGN PATENT DOCUMENTS

| 749456 | 11/1944 | Fed. Rep. of Germany | 123/DIG. 4 |
|---|---|---|---|
| 2361177 | 6/1974 | Fed. Rep. of Germany | 123/DIG. 4 |
| 2650834 | 6/1977 | Fed. Rep. of Germany | 123/DIG. 4 |
| 2743780 | 4/1979 | Fed. Rep. of Germany | 123/DIG. 4 |

*Primary Examiner*—Wendell E. Burns
*Attorney, Agent, or Firm*—Stevens, Davis, Miller & Mosher

[57] ABSTRACT

An engine comprising one pair of scavenge ports alternately covered and uncovered by a piston, a richer air-fuel mixture and a leaner air-fuel mixture being separately fed into the cylinder from the scavenge ports, the richer air-fuel mixture flowing into the cylinder towards the inner wall thereof, located opposite the exhaust port, and the leaner air-fuel mixture flowing into the cylinder so that it overlays the richer air-fuel mixture.

56 Claims, 64 Drawing Figures

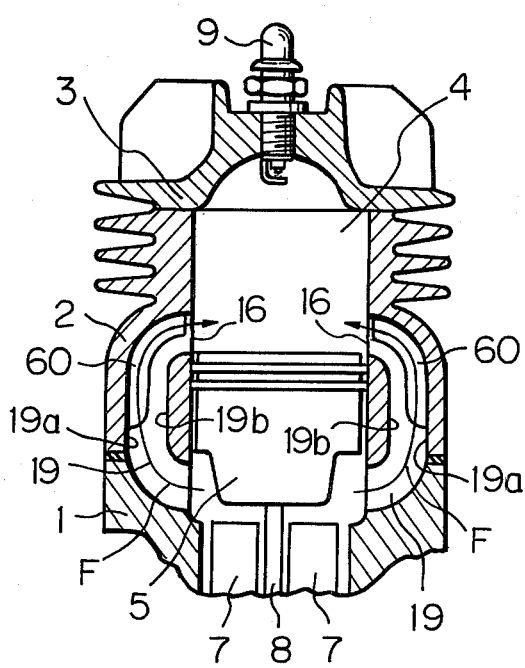
Fig. 30
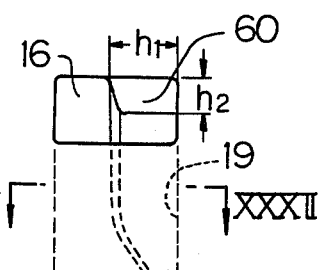
Fig. 32
Fig. 31
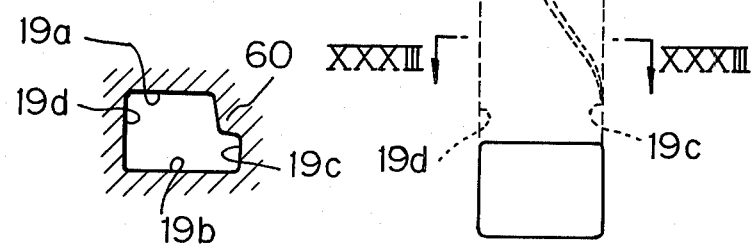
Fig. 33

TWO-STROKE INTERNAL-COMBUSTION ENGINE

BACKGROUND OF THE INVENTION

1. Field of the Invention

The present invention relates to a two-stroke internal-combustion engine.

2. Description of the Prior Art

In a two-stroke internal-combustion engine in which the burnt gas in the engine cylinders is scavenged by an air-fuel mixture fed into the engine cylinders from the scavenged port, air and fuel are fully mixed so as to form a uniform air-fuel mixture before they are fed into the engine cylinders. Then the uniformly premixed air-fuel mixture is fed into the engine cylinders, and the burnt gas in the engine cylinders is savenged by the uniformly premixed air-fuel mixture. However, in such a two-stroke internal-combustion engine, when the air-fuel mixture flows into the engine cylinders, part of it escapes into the exhaust passage from the exhaust port. Thus, a large amount of fuel is discharged into the exhaust passage without being burnt, with the result that fuel consumption is increased and the amount of harmful hydrocarbon (HC) components in the exhaust gas is increased.

SUMMARY OF THE INVENTION

The present invention provides a two-stroke internal-combustion engine capable of considerably reducing fuel consumption and the amount of harmful HC components in the exhaust gas by preventing the fuel from escaping into the exhaust passage.

According to the present invention, there is provided a two-stroke internal-combustion engine comprising: a cylinder block having a cylinder therein; a piston reciprocally movable in the cylinder, the cylinder having an inner wall which has a scavenge port and an exhaust port formed thereon and which is alternately covered and uncovered by the piston; a crankcase having therein an interior chamber, the pressure in the interior chamber being alternately increased and decreased due to the reciprocal motion of the piston; an intake passage having an air inlet and being connected to the interior chamber of the crankcase; a transfer passage interconnecting the interior chamber of the crankcase and the scavenge port, outside air being fed into the cylinder via an air passage defined by the intake passage, the interior chamber of the crankcase, and the transfer passage; fuel supply means arranged in the air passage for feeding fuel into the air passage so as to form an air-fuel mixture therein; and fuel-separating means arranged in the air passage for separating fuel from the air-fuel mixture so as to form a richer air-fuel mixture and a leaner air-fuel mixture, the scavenge port having such a construction that the richer air-fuel mixture flows into the cylinder towards the inner wall of the cylinder, the inner wall being located opposite the scavenge port.

The present invention may be more fully understood from the description of the preferred embodiments set forth below with reference to the accompanying drawings.

BRIEF DESCRIPTION OF THE DRAWINGS

FIG. 30 is a cross-sectional side view of the engine of FIG. 29 taken along the line XXX—XXX in FIG. 29.

FIG. 31 is an enlarged view of the inner wall of the cylinder of FIG. 29 in which only the scavenge port and the transfer passage are illustrated.

FIG. 32 is a cross-sectional side view of the transfer passage of FIG. 31 taken along the line XXXII—XXXII in FIG. 31.

FIG. 33 is a cross-sectional side view of the transfer passage of FIG. 31 taken along the line XXXIII—XXXIII in FIG. 31.

DESCRIPTION OF THE PREFERRED EMBODIMENTS

Before various embodiments according to the present invention are described, the basic concept of the present invention is described with reference to FIGS. 1 through 10.

Figure 1:
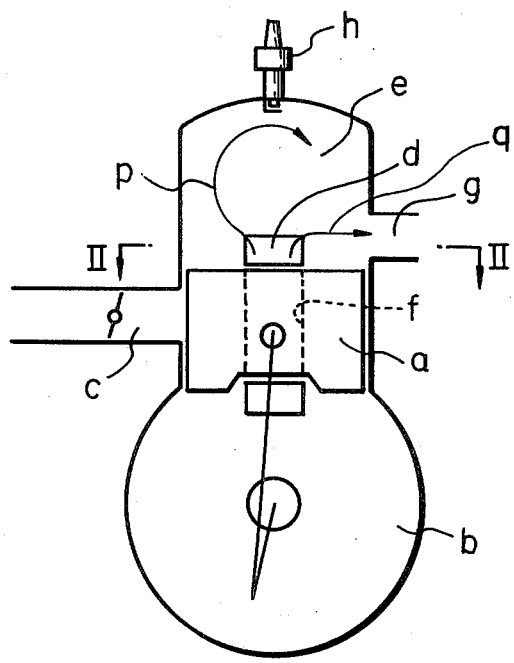
FIG. 1 is a schematic cross-sectional side view of a two-stroke engine in which a conventional scavenge operation is illustrated.
Figure 2:
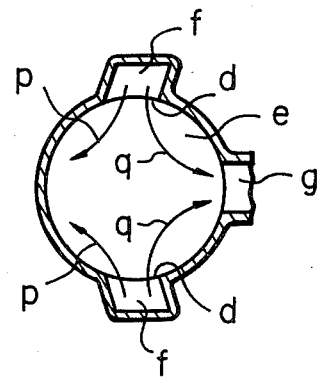
FIG. 2 is a cross-sectional view of the engine of FIG. 1 taken along the line II—II in FIG. 1.
Figure 3:
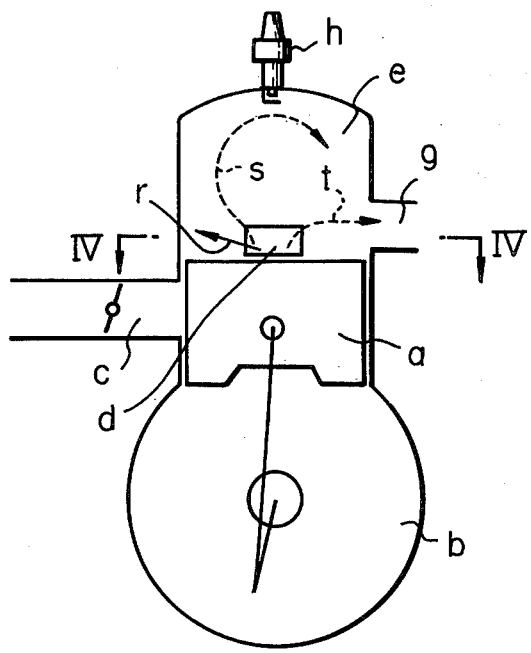
FIG. 3 is a schematic cross-sectional side view of a two-stroke engine in which the basic idea of the scavenge operation according to the present invention is illustrated.

FIGS. 1 and 2 schematically illustrate the scavenge operation in a typical conventional two-stroke engine, and FIG. 3 schematically illustrates the essential scavenge operation according to the present invention. In the conventional two-stroke engine illustrated in FIGS. 1 and 2, when the piston a approaches the top dead center, the air-fuel mixture is fed into the crankcase b from the intake passage c. Then, when the downward movement of the piston a begins, the air-fuel mixture in the crankcase b is compressed. When the piston a further moves downward and uncovers the scavenge port d, the uniformly mixed air-fuel mixture under pressure in the crankcase b is fed into the cylinder e from the scavenge ports d via the transfer passages f. At this time, the burnt gas in the cylinder e is scavenged by the air-fuel mixture and is thus discharged into the outside air from the exhaust port g. Then, when the piston a moves upward and approaches the top dead center, the air-fuel mixture is ignited by the spark plug h.

In such a conventional two-stroke engine, when the piston a uncovers the scavenge ports d, the uniformly mixed air-fuel mixture flows into the cylinder e from the scavenge ports d as mentioned above. At this time, the air-fuel mixture flowing out of a portion of each of the scavenge ports d located remote from the exhaust port g moves forward towards the inner wall of the cylinder e, which inner wall is located opposite the exhaust port g, as is illustrated by the arrow P in FIG. 1. However, at this time, the air-fuel mixture flowing out of a portion of each of the scavenge ports d located near the exhaust port g moves forward towards the exhaust port g as is illustrated by the arrow q in FIG. 1 and then escapes into the outside air via the exhaust port g. In a conventional two-stroke engine, since part of the air-fuel mixture fed into the cylinder e escapes into the outside air as mentioned above, a large amount of fuel is discharged into the outside air without being burnt, and, thus, fuel consumption and the amount of harmful HC components in the exhaust gas are increased.

In a conventional two-stroke engine, if the scavenge ports d are so formed that the entire air-fuel mixture does not move forward towards the exhaust port g when the piston a uncovers the exhaust port g, it is possible to prevent fuel from escaping into the outside air. However, it is impossible to form the scavenge ports d so that the entire air-fuel mixture does not move forward towards the exhaust port g.

Therefore, the present inventors considered that if fuel or a rich air-fuel mixture is caused to flow into the cylinder e towards the inner wall of the cylinder e located opposite the exhaust port g and if air or an extremely lean air-fuel mixture is caused to flow into the cylinder e so as to prevent the fuel or the rich air-fuel mixture from moving forward toward the exhaust port g, only the air or the extremely lean air-fuel mixture escapes from the cylinder e via the exhaust port g. Thus, it is possible to completely prevent fuel from escaping into the outside air or to reduce the amount of fuel which escapes into the outside air. That is, in FIGS. 3 and 4, if the fuel or the rich air-fuel mixture is caused to flow into the cylinder e as is illustrated by the arrow r and air or the extremely lean air-fuel mixture is caused to flow into the cylinder e so that the air or the extremely lean air-fuel mixture overlays the layer of the rich air-fuel mixture as is illustrated by the arrow S, since the rich air-fuel mixture is prevented from moving forward towards the exhaust port g by the air or the extremely lean air-fuel mixture, part of the air or the extremely lean air-fuel mixture escapes into the outside air via the exhaust port g as is illustrated by the arrow t.

Figure 4:
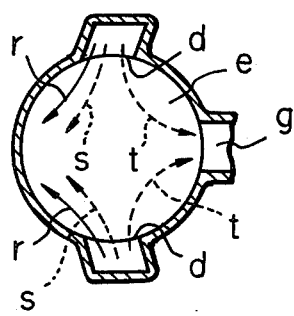
FIG. 4 is a cross-sectional view of the engine of FIG. 3 taken along the line IV—IV in FIG. 3.

The method of the scavenge operation illustrated in FIGS. 3 and 4 is quite novel. That is, a method of stratifying the air-fuel mixture in the cylinder e with fuel injected by a fuel injector arranged in the cylinder is known. However, in the present invention, the air-fuel mixture in the cylinder e is stratified with an air-fuel mixture fed from the scavenge ports d only, and, therefore, the present invention is quite different from the method of stratifying the air-fuel mixture in the cylinder e by using a fuel injector arranged in the cylinder e. In addition, in the present invention, ambient air is introduced into the crankcase b via a single air inlet. Then fuel is fed into the air and is then fed into the cylinder e together with the air. As was mentioned above, in the present invention, since ambient air is introduced into the crankcase b via only the single air inlet, it is possible to easily control operation of the engine by merely controlling the amount of air introduced from the single air inlet. Consequently, it is possible to simplify the construction of an engine.

An essential idea of the present invention is to separately feed a rich air-fuel mixture and a lean air-fuel mixture into the cylinder e from the scavenge ports d. In order to separately feed a rich air-fuel mixture and a lean air-fuel mixture as mentioned above, various methods, illustrated in FIGS. 5 through 10, are considered.

Figure 5:
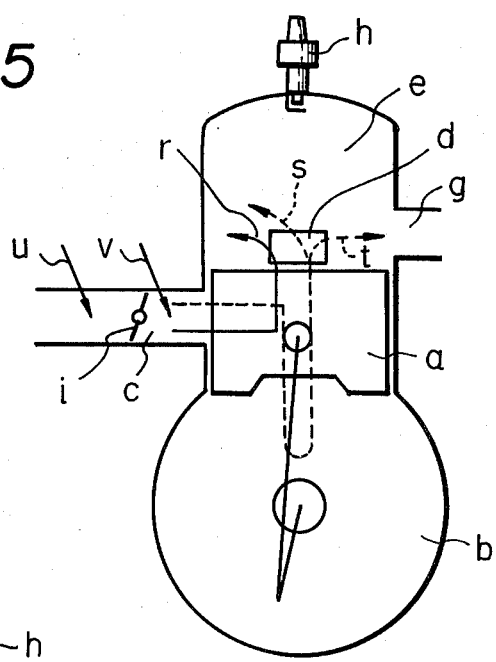
FIG. 5 is a schematic cross-sectional side view of a two-stroke engine in which the first method of the scavenge operation according to the present invention is illustrated.

In the first method, illustrated in FIG. 5, fuel is fed into the intake passage c upstream or downstream of the throttle valve i as illustrated by the arrows U and V, and the air-fuel mixture is divided into a richer air-fuel mixture and a leaner air-fuel mixture in the intake passage c. Then the richer air-fuel mixture is fed into the cylinder e from the scavenge ports d due to the compressing action of the piston a as is illustrated by the arrow r, and the leaner air-fuel mixture is also fed into the cylinder c from the scavenge ports d due to the compressing action of the piston a as is illustrated by the arrows s and t. In the two-stroke engine illustrated in FIG. 6, a pair of scavenge ports d1 and a pair of scavenge ports d2 are provided, and the richer air-fuel mixture and the leaner air-fuel mixture are fed into the cylinder e from the scavenge ports d1 and d2, respectively. As was mentioned above, in the first method illustrted in FIGS. 5 and 6, an air-fuel mixture is created in the intake passage c and is the divided into a air-fuel mixture and a leaner air-fuel mixture in the intake passage c.

Figure 7:
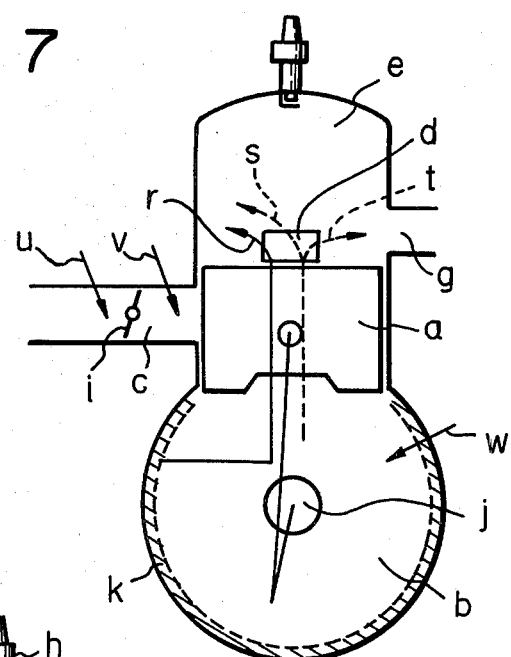
FIG. 7 is a schematic cross-sectional side view of a two-stroke engine in which the second method of the scavenge operation according to the present invention is illustrated.
Figure 8:
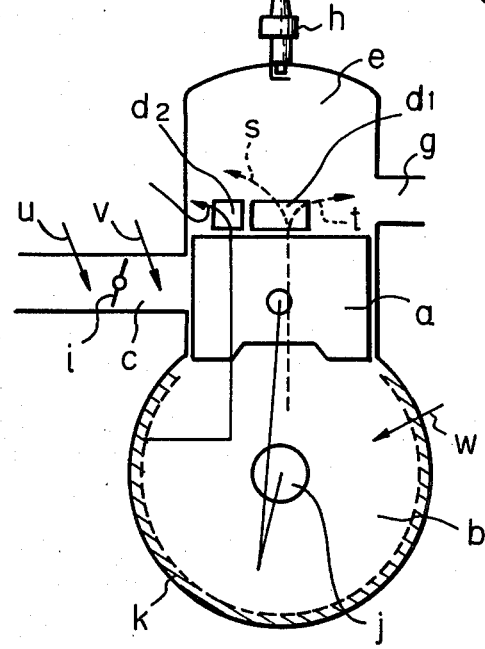
FIG. 8 is a schematic cross-sectional side view of another type of two-stroke engine in which the second method of the scavenge operation according to the present invention is illustrated.

In the second method, illustrated in FIG. 7, fuel is separated from the air-fuel mixture in the crankcase b due to a centrifugal force which acts thereon, the centrifugal force being generated by the rotation of the balance weights (not shown) of the crankshaft j. That is, when the balance weights of the crankshaft j rotate, the centrifugal force acts on the air-fuel mixture in the crankcase b, and, as a result, fuel k collects on the circumferential wall of the crankcase b. Then the fuel k is fed into the cylinder e, in the form of a richer air-fuel mixture, from the scavenge ports d due to the compressing action of the piston a as is illustrated by the arrow r, and a leaner air-fuel mixture created in the crankcase b is fed into the cylinder e from the scavenge ports d due to the compressing action of the piston a as is illustrated by the arrows s and t. In FIG. 8, a richer air-fuel mixture and a leaner air-fuel mixture are fed into the cylinder e via the separate scavenge ports d2 and d1, respectively. In the two-stroke engines illustrated in FIGS. 7 and 8, fuel may be fed into the intake passage c as is illustrated by the arrows U and V or into the crankcase b as is illustrated by the arrow W. As was mentioned above, in the second method illustrated in FIGS. 7 and 8, fuel is separated from the air-fuel mixture in the crankcase b so as to form a richer air-fuel mixture and a leaner air-fuel mixture.

Figure 9:
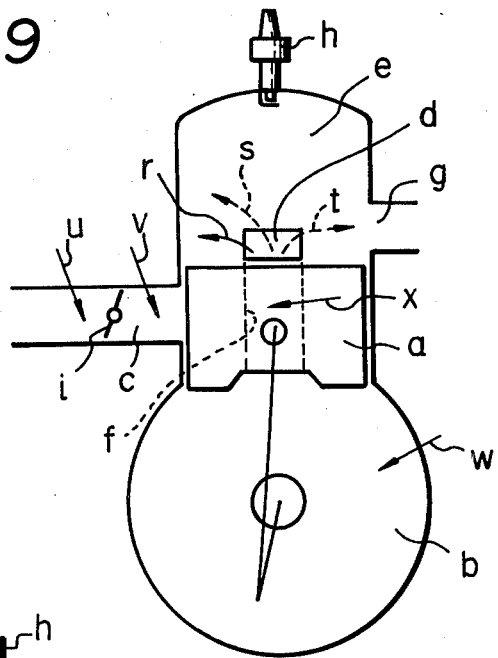
FIG. 9 is a schematic cross-sectional side view of a two-stroke engine in which the third method of the scavenge operation according to the present invention is illustrated.
Figure 10:
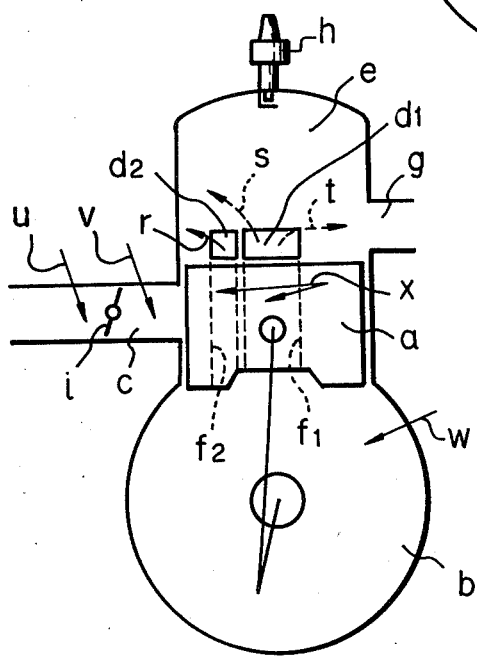
FIG. 10 is a schematic cross-sectional side view of another type of two-stroke engine in which the third method of the scavenge operation according to the present invention is illustrated.

In the third method, illustrated in FIG. 9, a richer air-fuel mixture and a leaner air-fuel mixture are created in the transfer passages f or at the scavenge ports d and then are separately fed into the cylinder e. In FIG. 10, a pair of transfer passages f1 and a pair of transfer passages f2 are provided, and a richer air-fuel mixture is fed into the cylinder e from the scavenge ports d2 via the transfer passages f2 due to the compressing action of the piston a as is illustrated by the arrow r. In addition, a leaner air-fuel mixture or air is fed into the cylinder e from the scavenge ports d1 via the transfer passages f1 due to the compressing action of the piston a as is illustrated by the arrows s and t. In the two-stroke engines illustrated in FIGS. 9 and 10, fuel may be fed into the intake passage c as is illustrated by the arrows U and V and into the crankcase b as is illustrated by the arrow W. In the case where fuel is fed into the intake passage c or the crankcase b, the air-fuel mixture is fed into the transfer passages f, f1, and f2, and the fuel is separated from the air-fuel mixture in the transfer passages f, f1, and f2 or at the scavenge ports d. On the other hand, fuel may be fed into the transfer passages f, f1, and f2 as is illustrated by the arrow X. Such a case, a richer air-fuel mixture and a leaner air-fuel mixture are created in the transfer passages f, f1, and f2.

As was mentioned previously, an essential idea of the present invention is to separately feed a rich air-fuel mixture and a leaner air-fuel mixture into the cylinder e from the scavenge ports d. The various methods illustrated in FIGS. 5 through 10 are considered in order to separately feed a richer air-fuel mixture and a leaner air-fuel mixture into the cylinder e from the scavenge ports d. FIGS. 5 through 10 illustrate the basic concept for creating a richer air-fuel mixture and a leaner air-fuel mixture by using air fed from a single air inlet, which basic concept is hereinafter described in detail.

Figure 6:
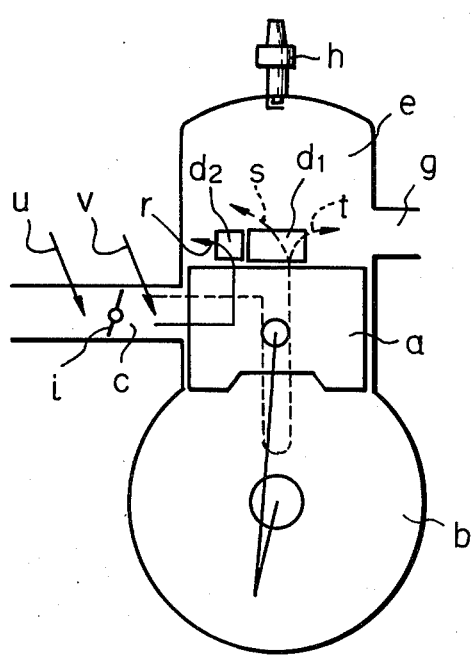
FIG. 6 is a schematic cross-sectional side view of another type of two-stroke engine in which the first method of the scavenge operation according to the present invention is illustrated.
Figure 11:
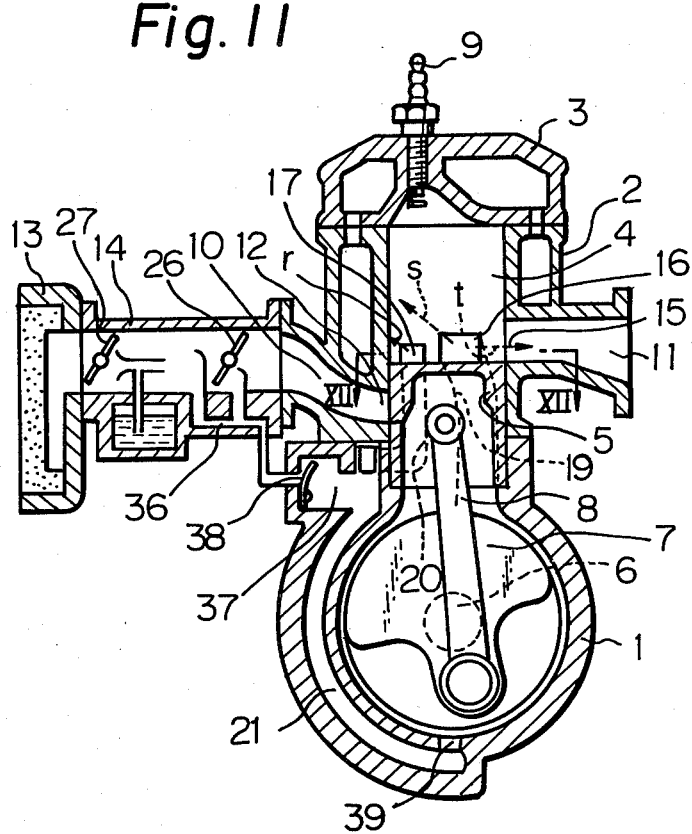
FIG. 11 is a cross-sectional side view of an embodiment of a two-stroke engine according to the present invention.
Figure 12:
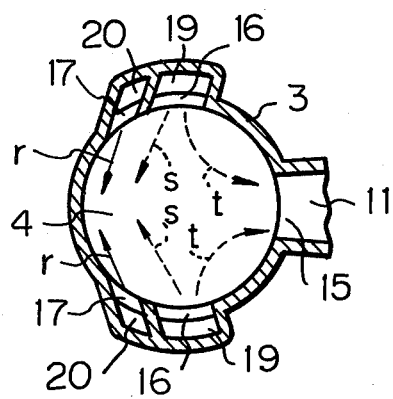
FIG. 12 is a cross-sectional side view of the engine of FIG. 11 taken along the line XII—XII in FIG. 11.

FIG. 11 illustrates a two-stroke engine in which the first method illustrated in FIGS. 5 and 6 is put to practical use. In FIG. 11, reference numeral 1 designates a crankcase, 2 a cylinder block, 3 a cylinder head, 4 a cylinder formed in the cylinder block 2, 5 a piston reciprocally movable in the cylinder 4, 6 a crankshaft, 7 balance weights, 8 a connecting rod interconnecting the piston 5 and the balance weights 7, 9 a spark plug arranged in the cylinder 4, 10 an intake passage, and 11 an exhaust passage. When the piston 5 moves up and down in the cylinder 4, the balance weights 7 rotate in a predetermined direction accordingly. The intake passage 10 has at one end thereof an intake port 12 which is open to the cylinder 4, and the intake port 12 is alternately covered and uncovered by the piston 5. The other end of the intake passage 10 is connected to an air filter 13 via a carburetor 14. The exhaust passage 11 has at one end thereof an exhaust port 15 which is open to the cylinder 4, and the exhaust port 15 is alternately covered and uncovered by the piston 5. The other end of the exhaust passage 11 is open to the outside air. As is illustrated in FIG. 12, a pair of first scavenge ports 16 and a pair of second scavenge ports 17 are formed on the inner wall of the cylinder 4, and each of the first scavenge ports 16 is arranged adjacent to the corresponding second scavenge port 17. The first scavenge ports 16 and the second scavenge ports 17 are symmetrically arranged with respect to the axis passing through the exhaust passage 11, and the openings of the first scavenge ports 16 and the second scavenge ports 17 are directed toward the inner wall of the cylinder 4, the inner wall being located opposite the exhaust port 15. The first scavenge ports 16 are connected to the upper interior of the crankcase 1 via corresponding first transfer passages 19 which have a relatively large cross-sectional area and a relatively short length.

Figure 13:
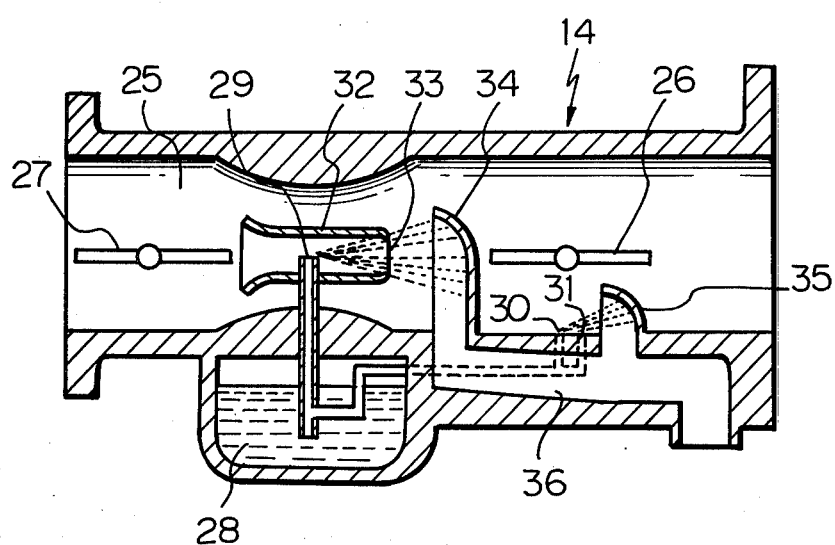
FIG. 13 is an enlarged cross-sectional side view of the carburetor illustrated in FIG. 11.

Referring to FIGS. 11 and 13, the side-draft type carburetor 14 comprises an intake passage 25 formed therein, a throttle valve 26, a choke valve 27, a float chamber 28, a main nozzle 29, a slow fuel port 30, and an idle port 31. When the engine is operated, fuel in the float chamber 28 is fed into the intake passage 25 from the main nozzle 29, the slow fuel port 30, and the idle port 31. The main nozzle 29 is arranged in a small, hollow, tubular venturi 32, and, thus, fuel flowing out of the main nozzle 29 is discharged through the outlet opening 33 of the small venturi 32. A main fuel trapper 34, projecting upwardly from the bottom face of the intake passage 25, is arranged downstream of the outlet opening 33 of the small venturi 32 so that it is able to trap the fuel discharged through the main nozzle 29. In addition, an auxiliary fuel trapper 35, projecting upwardly from the bottom face of the intake passage 25, is arranged downstream of the slow fuel port 30 and the idle port 31 so that it is able to trap the fuel flowing out of the slow fuel port 30 and the idle port 31. A horizontally-extending fuel passage 36 is formed beneath the main fuel trapper 34 and the auxiliary fuel trapper 35, and the fuel trappped by the fuel trappers 34 and 35 is collected in the fuel passage 36. As is illustrated in FIG. 11, the fuel passage 36 extends downward and is connected to a fuel-collecting chamber 37 via a reed valve 38. The fuel-collecting chamber 37 is connected, on the one hand, to the second scavenge ports 17 via corresponding second transfer passages 20 and, on the other hand, to the bottom interior of the crankcase 1 via a second transfer passage 21 (FIG. 11). As will be understood from FIG. 11, the second transfer passages 20 and 21 have a cross-sectional area which is smaller than that of the first transfer passages 19, and, therefore, the flow resistance of the second transfer passages 20 and 21 is greater than that of the first transfer passages 19. In addition, as is illustrated in FIG. 12, the first scavenge ports 16 have a height which is higher than that of the second scavenge ports 17. Thus, when the piston 5 moves downward, it uncovers the second scavenge ports 17 after it uncovers the first scavenge ports 16.

As was mentioned above, when the engine is operated, fuel is fed into the intake passage 25 of the carburetor 14 from the main nozzle 29, the slow fuel passage 30, and the idle port 31. At this time, the amount of fuel which is vaporized when the fuel flows out of the main nozzle 29, the slow fuel port 30, and the idle port 31 is extremely small, and a large amount of fuel flows within the intake passage 25 of the carburetor 14 in the form of fine particles or flows along the bottom face of the intake passage 25 in the form of a liquid fuel. The liquid fuel and the fine particles of fuel are trapped by the main fuel trapper 34 and the auxiliary fuel trapper 35, and, thus, an extremely lean air-fuel mixture is fed into the intake passage 10 formed in the cylinder block 2. The fuel trapped by the fuel trappers 34, 35 is collected in the fuel passage 36.

When the upward movement of the piston 5 begins, since the pressure in the crankcase 1 is reduced, the fuel collected in the fuel passage 36 is sucked into the fuel-collecting chamber 37. When the piston 5 further moves upward and uncovers the intake port 12, the extremely lean air-fuel mixture flows into the crankcase 1. At this time, since the balance weights 7 rotate at a high speed, a centrifugal force acts on the air-fuel mixture, and, thus, the fine particles of fuel contained in the air-fuel mixture adhere to the inner circumferential wall of the crankcase 1 and form a liquid film. The liquid film moves along the inner circumferential wall of the crankcase 1 in the direction of rotation of the balance weights 7, and when the liquid film reaches a bore 39 formed on the bottom face of the interior of the crankcase 1, the liquid fuel flows into the second transfer passage 21 via the bore 39.

When the piston 5 approaches the top dead center, the air-fuel mixture in the cylinder 4 is ignited by the spark plug 9 and the downward movement of the piston 5 begins. Then the piston 5 uncovers the exhaust port 15, and, thus, the burnt gas in the cylinder 4 is discharged into the exhaust passage 11 via the exhaust port 15. Next, the piston 5 uncovers the first scavenge ports 16. At this time, the extremely lean air-fuel mixture under pressure in the crankcase 1 flows into the cylinder 4 from the first scavenge ports 16 towards the inner wall of the cylinder 4, located opposite the exhaust port 15, as is illustrated by the arrow S in FIGS. 11 and 12. In addition, at this time, part of the extremely lean air-fuel mixture flows towards the exhaust port 15 as is illustrated by the arrowe t in FIGS. 11 and 12 and escapes into the exhaust passage 11 from the cylinder 4. Then the piston 5 uncovers the second scavenge ports 17. At this time, the extremely lean air-fuel mixture under pressure in the crankcase 1 is forced into the second transfer passages 21 and 20. The extremely lean air-fuel mixture is mixed with the liquid fuel flowing into the second transfer passage 21 and with the fine particles collected in the fuel-collecting chamber 37 and creates a rich air-fuel mixture. The rich air-fuel mixture flows into the cylinder 4 from the second scavenge ports 17 towards the inner wall of the cylinder 4. At this time, since the flow resistance of the second transfer passages 20 and 21 is greater than that of the first transfer passages 19, the rich air-fuel mixture gently flows into the cylinder 4. When the rich air-fuel mixture flows into the cylinder 4, it is surrounded by the extremely lean air-fuel mixture flowing out of the first scavenge ports 16. That is, the lean air-fuel mixture overlays the rich air-fuel mixture. As a result, since the rich air-fuel mixture is prevented from escaping into the exhaust passage 11 from the cylinder 4, the amount of fuel which escapes into the exhaust passage 11 is reduced, and, thus, fuel consumption and the amount of harmful HC components in the exhaust gas can be reduced.

Figure 14:
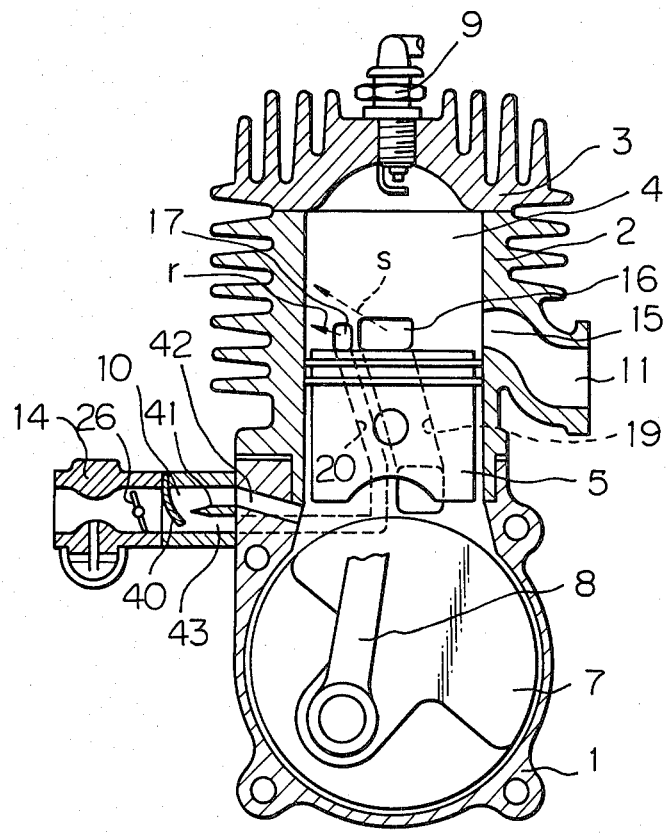
FIG. 14 is a cross-sectional side view of another embodiment of a two-stroke engine according to the present invention.
Figure 64:
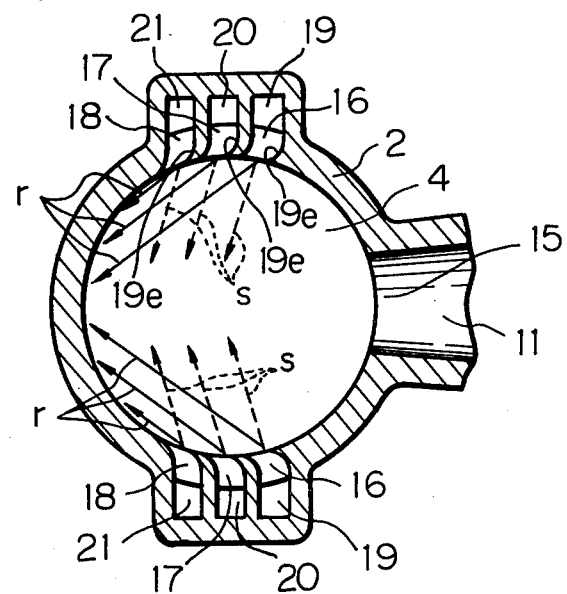
FIG. 64 is a cross-sectional side view of the engine of FIG. 63 taken along the line VIXIV—VIXIV in FIG. 63.

FIG. 14 illustrates another embodiment of a two-stroke engine in which the first method illustrated in FIGS. 5 and 6 is put to practical use. In FIGS. 6 through 64, which illustrate various separate embodiments, components similar to the components in FIG. 11 are indicated by the same reference numerals as in FIG. 11. In FIG. 14, a reed valve 40 is arranged in the air-intake passage 10 downstream of the throttle valve 26. In addition, a horizontally-extending separating wall 41 is formed in the intake passage 10 downstream of the reed valve 40, and the intake passage 10 is divided into an upper passage 42 and a lower passage 43 by the separating wall 41. The upper passage 42 is continuously connected to the upper interior of the crankcase 1, and the lower passage 43 is connected to the second scavenge ports 17 via the second transfer passages 20.

In this embodiment, when the upward movement of the piston 5 begins and the pressure in the crankcase 1 is reduced to below atmospheric pressure, the reed valve 40 opens and ambient air is fed, together with fuel fed from the carburetor 14, into the crankcase 1 via the upper passage 42. However, as was mentioned previously, a large amount of fuel fed from the carburetor 14 flows within the intake passage 10 in the form of fine particles and flows along the bottom wall of the intake passage 10 in the form of a liquid fuel. In addition, the fine particles of fuel impinge upon the reed valve 40 and then flow downward along the reed valve 40. Then the fine particles of fuel drop into the liquid fuel flowing along the bottom wall of the intake passage 10. When ambient air is fed into the crankcase 1 via the upper passage 42 as mentioned above, the liquid fuel flowing along the bottom wall of the intake passage 10 does not flow into the upper passage 42. Therefore, at this time, the amount of fuel flowing into the upper passage 42 is very small, and, thus, an extremely lean air-fuel mixture is fed into the crankcase 1. When the downward movement of the piston 5 begins, the reed valve 40 closes, and the lean air-fuel mixture in the crankcase 1 is compressed by the piston 5. When the piston 5 uncovers the first scavenge ports 16, the lean air-fuel mixture in the crankcase 1 is fed into the first scavenge ports 16 via the first transfer passages 19 and flows into the cylinder 4 from the first scavenge ports 16 as illustrated by the arrow S in FIG. 14. Then the piston 5 uncovers the second scavenge ports 17. At this time, the lean air-fuel mixture under pressure in the crankcase 1 is forced into the upper passage 42. Then the lean air-fuel mixture is turned around at the tip of the separating wall 41 and flows into the lower passage 43. At this time, since a large amount of liquid fuel is present in the lower passage 43, a rich air-fuel mixture is created in the lower passage 43. The rich air-fuel mixture is introduced into the second scavenge ports 17 via the second transfer passages 20 and flows into the cylinder 4 as is illustrated by the arrow r in FIG. 14.

Figure 15:
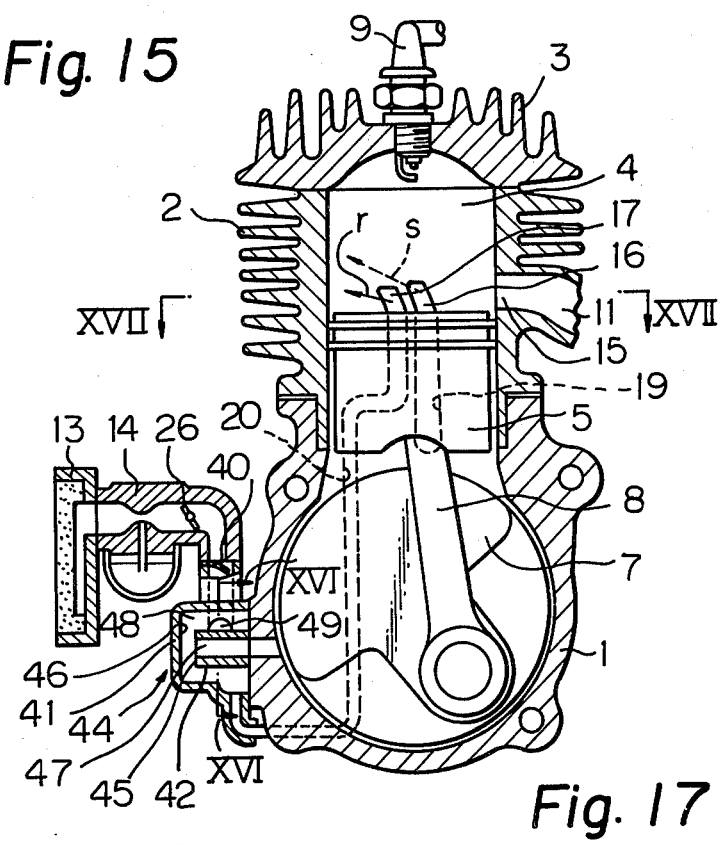
FIG. 15 is a cross-sectional side view of a further embodiment of a two-stroke engine according to the present invention.
Figure 16:
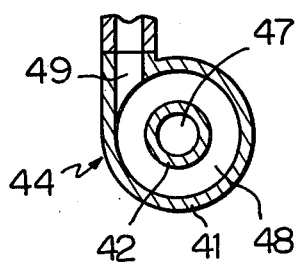
FIG. 16 is a cross-sectional side view of the separator of FIG. 15 taken along the line XVI—XVI in FIG. 15.
Figure 17:
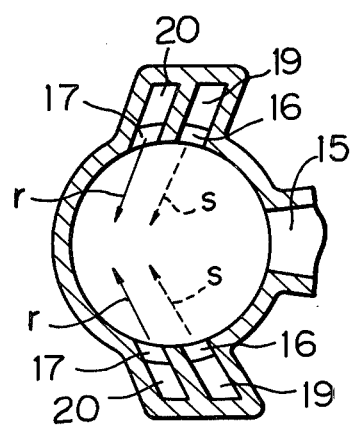
FIG. 17 is a cross-sectional side view of the engine of FIG. 15 taken along the line XVII—XVII in FIG. 15.

FIGS. 15 through 17 illustrate a further embodiment of a two-stroke engine in which the first method illustrated in FIGS. 5 and 6 is put to practical use. In this embodiment, an air-fuel mixture separator 44 is attached to the crankcase 1. The air-fuel mixture separator 44 comprises a cylindrical outer casing 41 and a hollow pipe 42 coaxially arranged therein, and the end face 45 of the hollow pipe 42 is arranged so that it is spaced from the end face 46 of the cylindrical outer casing 41. A lean air-fuel mixture passage 47 extends through the hollow pipe 42 and is open to the interior of the crankcase 1. An annular cross-sectional shaped vortex chamber 48 is formed between the hollow pipe 42 and the cylindrical outer casing 41, and the bottom interior of the vortex chamber 48 is connected to the second scavenge ports 17 via the second transfer passages 20. An air-fuel mixture inlet 49 is open to the vortex chamber 48 and is tangentially connected to the circumferential inner wall of the cylindrical outer casing 41. The air-fuel mixture inlet 49 is connected to the carburetor 14 via the reed valve 40.

In this embodiment, when the upward movement of the piston 5 begins and the pressure in the crankcase 1 is reduced to below atmospheric pressure, the reed valve 40 opens and ambient air is fed into the crankcase 1 via the air-fuel mixture inlet 49, the vortex chamber 48, and the lean air-fuel mixture passage 47 together with fuel fed from the carburetor 14. At this time, the air and fuel fed from the air-fuel mixture inlet 49 into the vortex chamber 48 swirl at a high speed along the cylindrical inner wall of the vortex chamber 48 and then flow into the lean air-fuel mixture passage 47. Consequently, a large amount of fuel collects on the cylindrical inner wall of the vortex chamber 48, and, thus, a small amount of fuel is fed into the lean air-fuel mixture passage 47. As a result, the air-fuel mixture fed into the crankcase 1 becomes extremely lean. When the piston 5 uncovers the first scavenge ports 16, the extremely lean air-fuel mixture under pressure in the crankcase 1 flows into the cylinder 4 from the first scavenge ports 16 as illustrated by the arrows s in FIGS. 15 and 17. Then, when the piston 5 uncovers the second scavenge ports 17, the lean air-fuel mixture under pressure in the crankcase 1 is forced into the vortex chamber 48 via the lean air-fuel mixture passage 47. At this time, since a large amount of fuel is present in the vortex chamber 48 and has collected on the bottom of the vortex chamber 48, a rich air-fuel mixture is created in the second transfer passages 20. This rich air-fuel mixture flows into the cylinder 4 from the second scavenge ports 17 as is illustrated by the arrows r in FIGS. 15 and 17.

Figure 18:
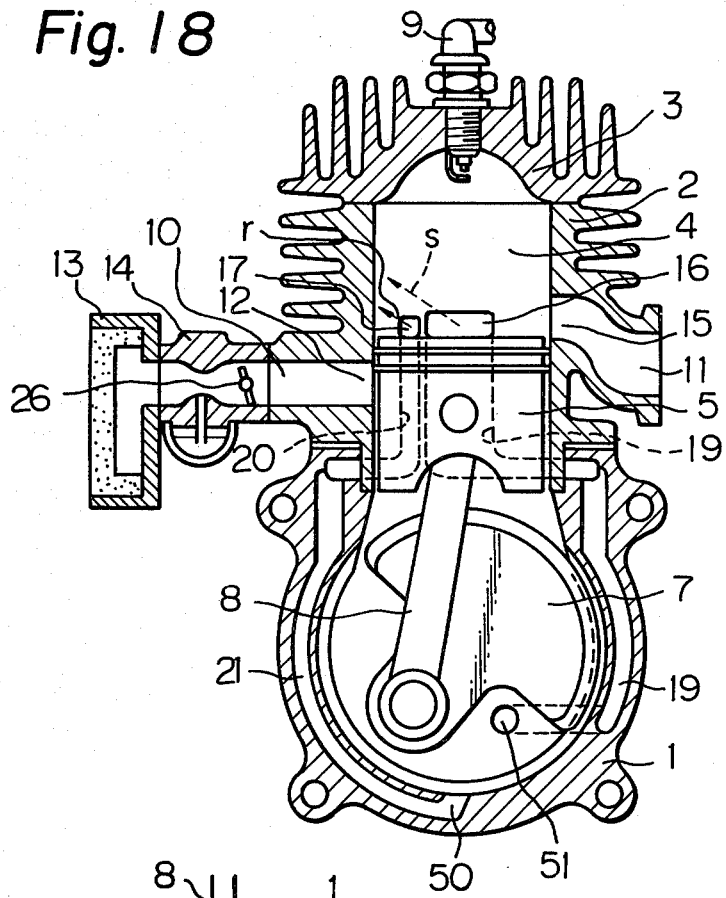
FIG. 18 is a cross-sectional side view of still a further embodiment of a two-stroke engine according to the present invention.
Figure 20:
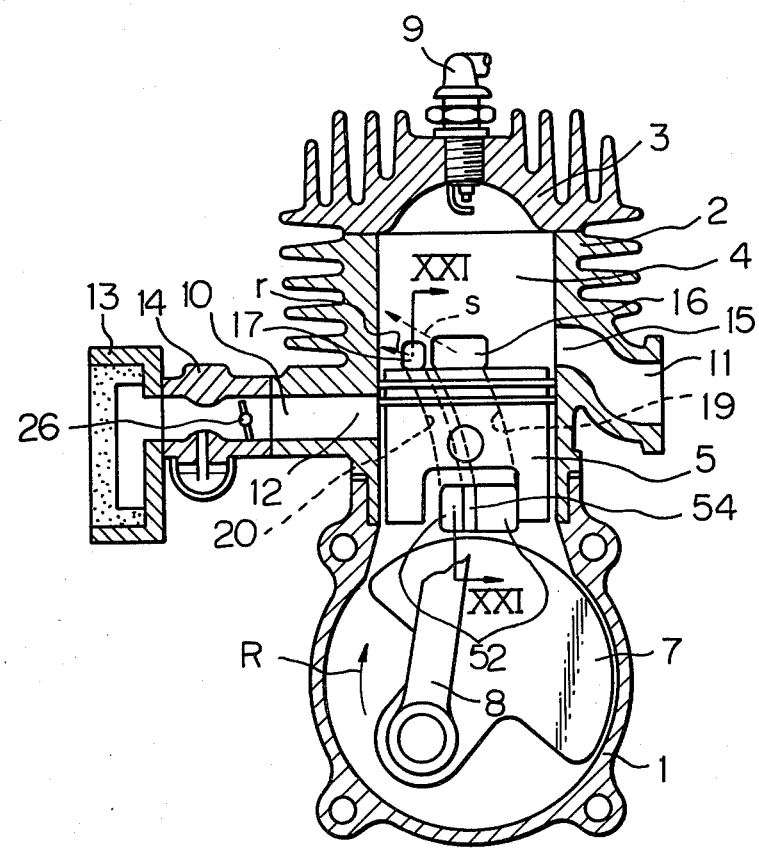
FIG. 20 is a cross-sectional side view of yet another embodiment of two-stroke engine according to the present invention.
Figure 23:
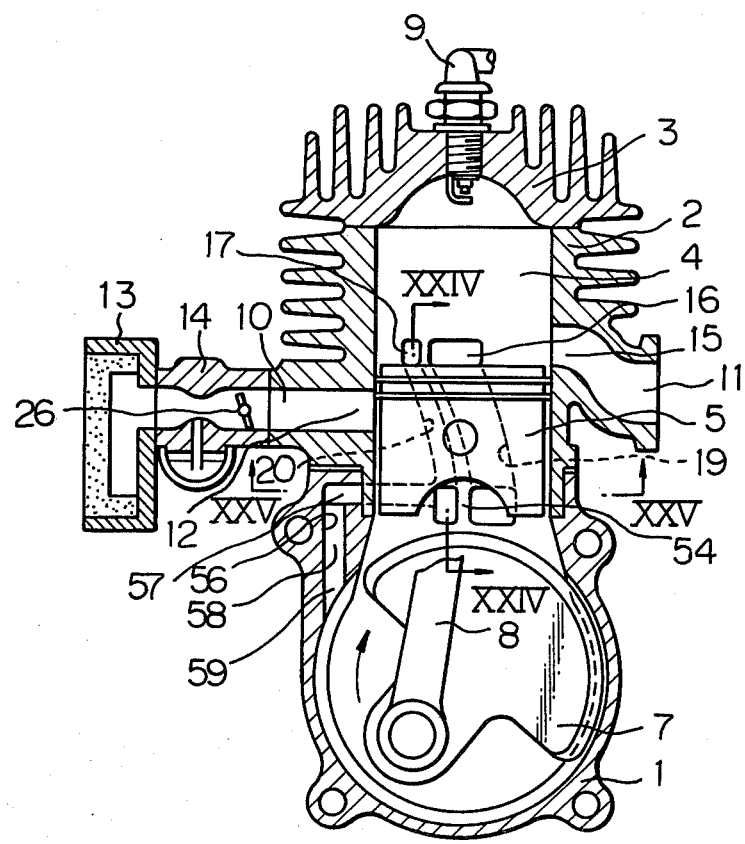
FIG. 23 is a cross-sectional side view of still a further embodiment of a two-stroke engine according to the present invention.

FIGS. 18, 20, and 23 illustrate separate embodiments of a two-stroke engine in which the second method illustrated in FIGS. 7 and 8 is put to practical use. That is, in these embodiments, when the piston 5 moves upward and uncovers the intake port 12, liquid fuel and an air-fuel mixture containing fine particles of fuel therein are fed into the crankcase 1. At this time, since a centrifugal force acts on the liquid fuel and the fine particles in the crankcase 1 due to the rotation of the balance weights 7, the liquid fuel and the fine particles adhere to the inner circumferential wall of the crankcase 1 and then flow along the inner circumferential wall of the crankcase 1 in the direction of rotation of the balance weights 7. Therefore, in these embodiments, fuel is separated from the air-fuel mixture in the crankcase 1 and collects on the inner circumferential wall of the crankcase 1. Thus, an extremely lean air-fuel mixture is created in the central interior region of the crankcase 1. The thus-created lean air-fuel mixture is fed into the cylinder 4 from the first scavenge ports 16, and the fuel is fed into the cylinder 4 from the second scavenge ports 17 in the form of a rich air-fuel mixture.

Figure 19:
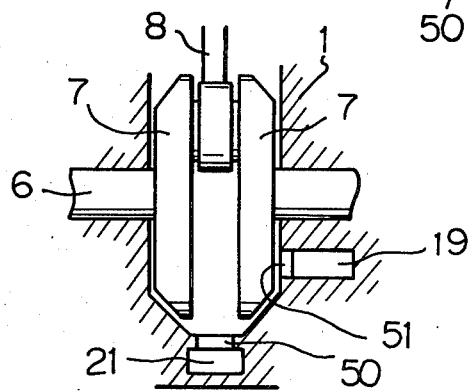
FIG. 19 is a cross-sectional side view of the engine illustrated in FIG. 18.

In the embodiment illustrated in FIGS. 18 and 19, a fuel inlet 50 is formed on the bottom wall of the interior of the crankcase 1 and is connected to the second scavenge ports 17 via the second transfer passages 21 and 20. In addition, a lean air-fuel mixture inlet 51 is formed on the vertical side wall of the interior of the crankcase 1 above the bottom wall thereof. In this embodiment, as was previously mentioned, an extremely lean air-fuel mixture is present in the central interior region of the crankcase 1, and the lean air-fuel mixture inlet 51 is open to the central interior region. Consequently, when the piston 5 uncovers the first scavenge ports 16, the extremely lean air-fuel mixture is forced into the first transfer passages 19 and then flows into the cylinder 4 from the first scavenge ports 16 as is illustrated by the arrow s in FIG. 18. On the other hand, the fuel which has collected on the inner circumferential wall of the crankcase 1 flows along the inner circumferential wall thereof, as was mentioned above, and when the fuel reaches the fuel inlet 50, it enters the second transfer passage 21 via the fuel inlet 50. Consequently, a large amount of fuel fed from the carburetor 14 is fed into the second transfer passage 21. When the piston 5 uncovers the second scavenge ports 17, the lean air-fuel mixture under pressure in the crankcase 1 is forced into the second transfer passage 21, and a rich air-fuel mixture is created in the second transfer passage 21. Then the rich air-fuel mixture is introduced into the second scavenge ports 17 via the second transfer passage 20 and flows into the cylinder 4 from the second scavenge ports 17 as is illustrated by the arrow r in FIG. 18.

Figure 21:
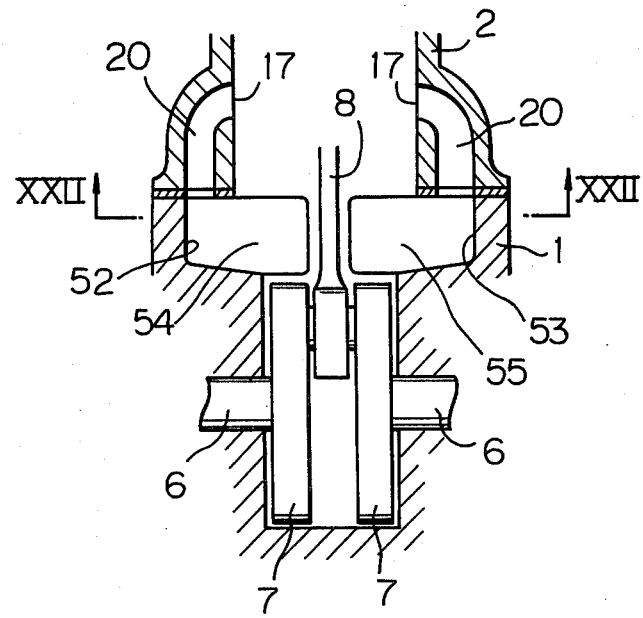
FIG. 21 is a cross-sectional side view of the engine illustrated in FIG. 20.
Figure 22:
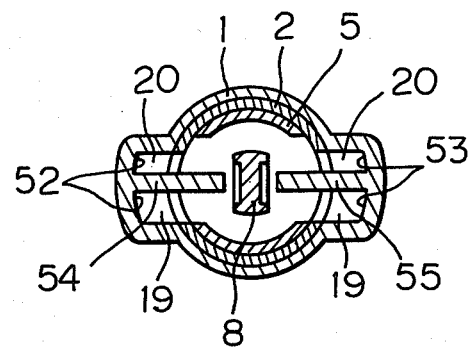
FIG. 22 is a cross-sectional side view of the engine of FIG. 21 taken along the line XXII—XXII in FIG. 21.

In the embodiment illustrated in FIGS. 20 through 22, a pair of recesses 52 and 53 are formed on the opposed inner side walls of the crankcase 1 between the cylinder block 2 and the balance weights 7. In addition, two vertical fuel-separating walls 54 and 55, which are formed integrally with the crankcase 1 and which are aligned with each other, are arranged in the recesses 52 and 53, respectively. Each of the recesses 52 and 53 is completely divided into two recess portions by the corresponding vertical fuel-separating walls 54 and 55, and the adjacent first transfer passages 19 and second transfer passages 20 are open to the corresponding recesses 52 and 53 on each side of the corresponding vertical fuel-separating walls 54 and 55. That is, each of the first transfer passages 19 is open to one of the recess portions of the correspnding recesses 52 and 53, and each of the second transfer passages 20 is open to the other recess portion of the corresponding recesses 52 and 53. As is illustrated in FIGS. 21 and 22, the vertical fuel-separating walls 54 and 55 project inwardly from the corresponding recesses 52 and 53 and extend to a point near the connecting rod 8. Consequently, the lower edges of the projecting portions of the vertical fuel-separating walls 54 and 55 are located near the top portions of the balance weights 7. In this embodiment, the balance weights 7 rotate in a clockwise direction as illustrated by the arrow R in FIG. 20. The first transfer passages 19 are open to the interior of the crankcase 1 or the clockwise direction side of the vertical fuel-separating walls 54 and 55 in FIG. 22, and the second transfer passages 20 are open to the interior of the crankcase 1 on the counterclockwise direction side of the vertical fuel-separating walls 54 and 55 in FIG. 20. In this embodiment, the vertical fuel-separating walls 54 and 55 are formed integrally with the crankcase 1 as mentioned above. However, the vertical fuel-separating walls 54 and 55 may be formed integrally with the cylinder block 2. In addition, in this embodiment, the vertical fuel-separating walls 54 and 55 are so arranged that they extend in the axial direction of the crankshaft 6. However, the vertical fuel-separating walls 54 and 55 may be inclined with respect to the axis of the crankshaft 6.

In this embodiment, as was mentioned above, fuel collects on the inner circumferential wall of the crankcase 1 and is caused to flow thereon in the direction of rotation of the balance weights 7. Consequently, the fuel reaches the vertical fuel-separating walls 54 and 55 sooner or later and is trapped by the vertical fuel-separating walls 54 and 55. Then the thus-trapped fuel collects in the recess portions, to which the second transfer passages 20 are open. Since the fuel is trapped by the vertical fuel-separating walls 54 and 55, no liquid fuel is introduced into the recess portions, to which the first transfer passages 19 are open. Consequently, when the piston 5 uncovers the first scavenge ports 16, the extremely lean air-fuel mixture in the crankcase 1 is introduced into the first scavenge ports 16 via the first transfer passages 19 and then flows into the cylinder 4 from the first scavenge ports 16 as illustrated by the arrow s in FIG. 20. When the piston 5 uncovers the second scavenge ports 17, the lean air-fuel mixture in the crankcase 1 is introduced into the second transfer passages 20. At this time, since a large amount of fuel collects in the recess portions to which the second transfer passages 20 are open, a rich air-fuel mixture is formed in the second transfer passages 20. The rich air-fuel mixture flows into the cylinder 4 from the second scavenge ports 17 as is illustrated by the arrow r in FIG. 20.

Figure 24:
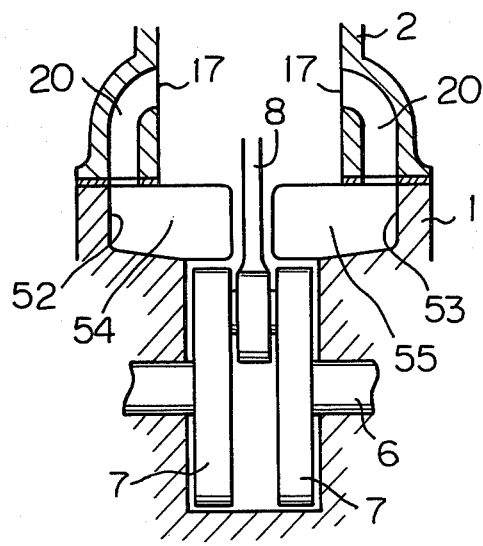
FIG. 24 is a cross-sectional side view of the engine illustrated in FIG. 23.
Figure 25:
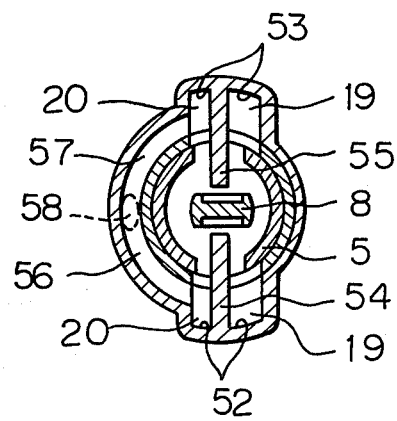
FIG. 25 is a cross-sectional side view of the engine of FIG. 23 taken along the line XXV—XXV in FIG. 23.

FIGS. 23 through 25 illustrate a modified embodiment of the engine illustrated in FIG. 20. In this embodiment, an additional fuel-collecting passage 56 is formed in the crankcase 1 for efficiently collecting fuel. The additional fuel-collecting passage 56 comprises an arc-shaped passage portion 57 and a straight passage portion 58 extending downwardly from the center of the arc-shaped passage portion 57. A fuel inlet 59, which is open to the interior of the crankcase 1, is formed at the lower end of the straight passage portion 58 and is tangentially connected to the inner circumferential wall of the crankcase 1. The opposed ends of the arc-shaped passage portion 57 are open to the corresponding recess portions, to which the second transfer passages 20 are open.

In this embodiment, part of the fuel flowing on the inner circumferential wall of the crankcase 1 enters the straight passage portion 58 from the fuel inlet 59 and then flows, via the arc-shaped passage portion 57, into the recess portions to which the second transfer passages 20 are open. The fuel which does not enter the straight passage portion 58 is trapped by the vertical fuel-separating walls 54 and 55. As was mentioned above, in this embodiment, since the fuel is trapped by both the fuel inlet 59 and the vertical fuel-separating walls 54 and 55, that is, since the fuel is trapped at two fuel-trapping stages, the fuel can definitely be trapped.

Figure 26:
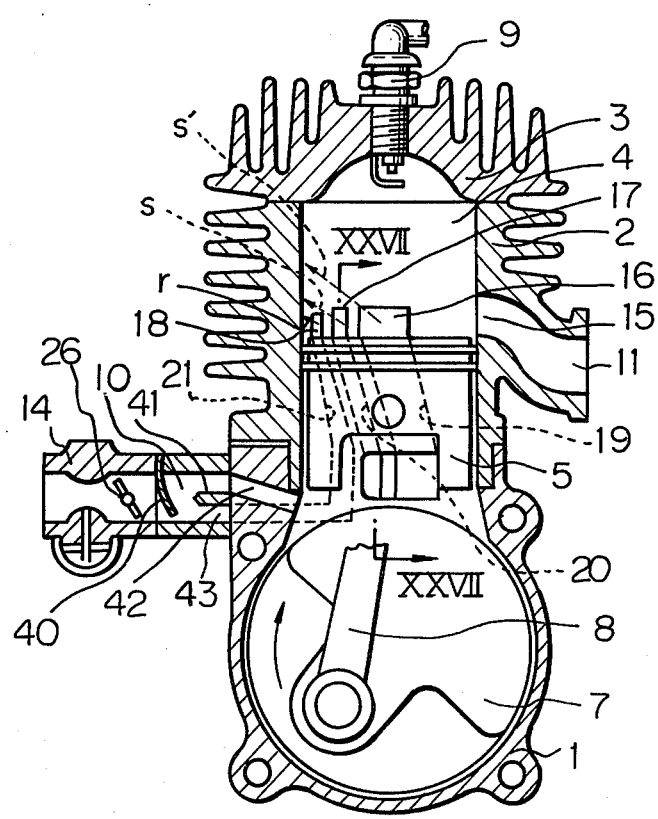
FIG. 26 is a cross-sectional side view of yet a further embodiment of a two-stroke engine according to the present invention.
Figure 27:
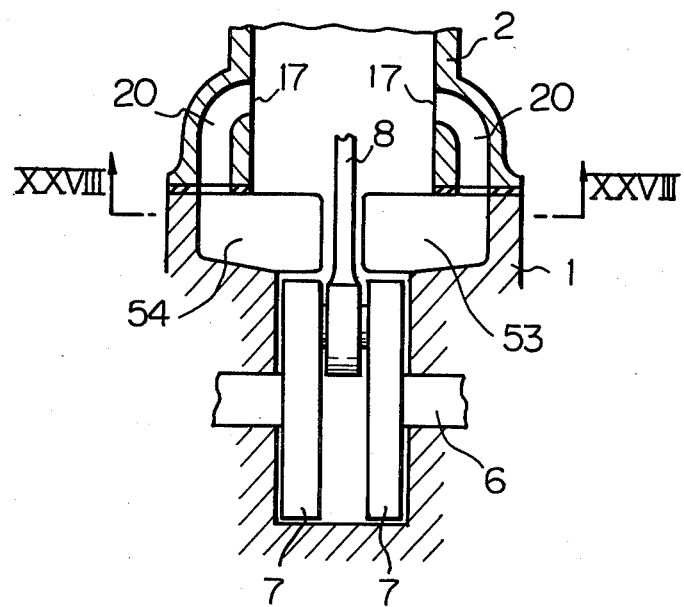
FIG. 27 is a cross-sectional side view of the engine illustrated in FIG. 26.
Figure 28:
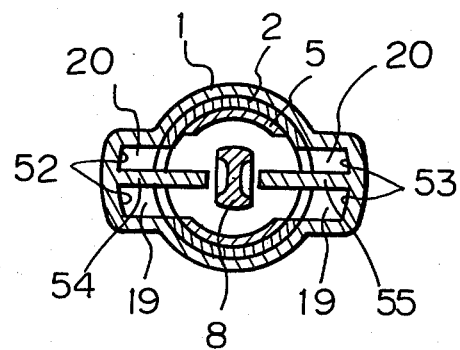
FIG. 28 is a cross-sectional side view of the engine of FIG. 27 taken along the line XXIII—XXIII in FIG. 27.
Figure 29:
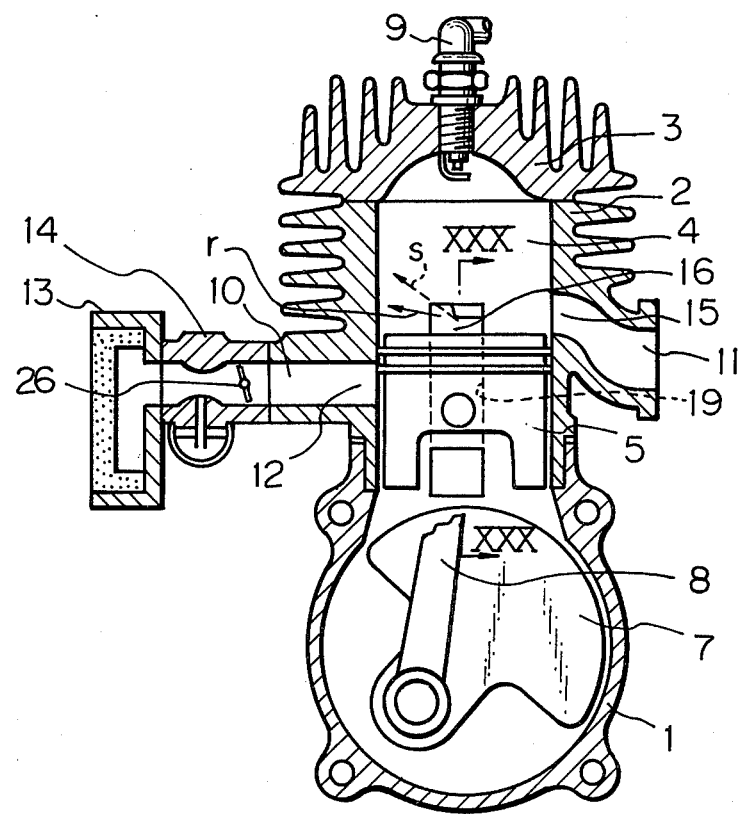
FIG. 29 is a cross-sectional side view of yet another embodiment of a two-stroke engine according to the present invention.
Figure 34:
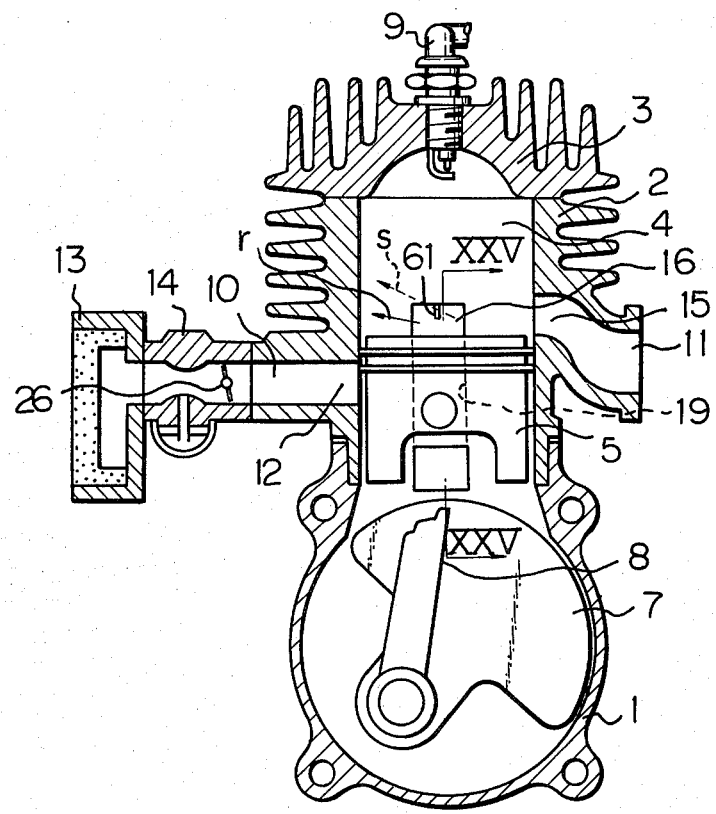
FIG. 34 is a cross-sectional side view of still another embodiment of a two-stroke engine according to the present invention.
Figure 35:
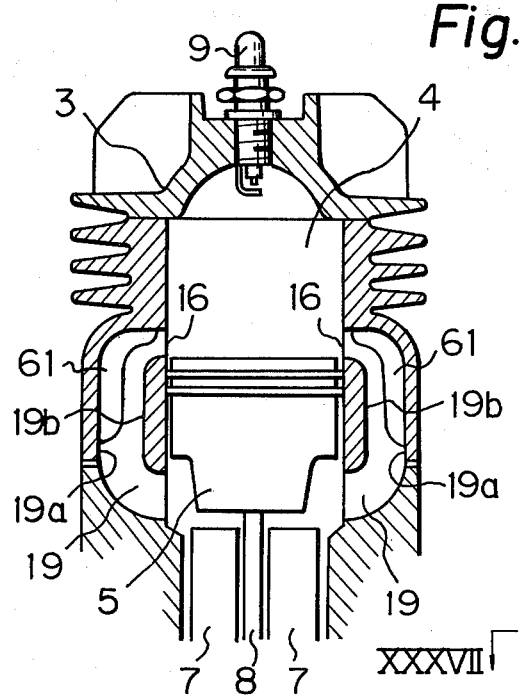
FIG. 35 is a cross-sectional side view of the engine of FIG. 34 taken along the line XXXV—XXXV in FIG. 34.
Figure 36:
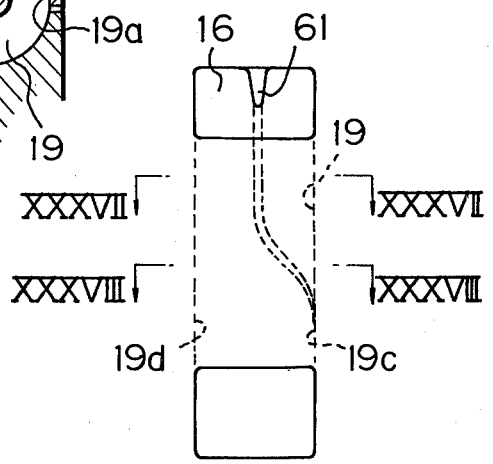
FIG. 36 is an enlarged view of the inner wall of the cylinder of FIG. 34 in which only the scavenge port and the transfer passage are illustrated.
Figure 37:
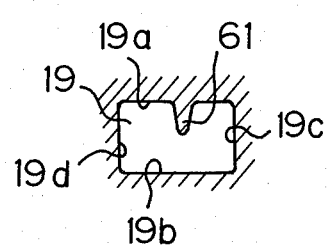
FIG. 37 is a cross-sectional side view of the transfer passage of FIG. 36 taken along the line XXXVII—XXXVII in FIG. 36.
Figure 38:
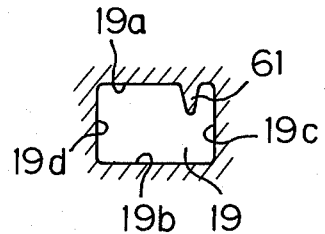
FIG. 38 is a cross-sectional side view of the transfer passage of FIG. 36 taken along the line XXXVIII—XXXVIII in FIG. 36.

FIGS. 26 through 28 illustrate an embodiment in which the first method illustrated in FIGS. 5 and 6 and the second method illustrated in FIGS. 7 and 8 are put to practical use at the same time. In this embodiment of a two-stroke engine, the fuel-separating system illustrated in FIG. 20 is combined with the fuel-separating system illustrated in FIG. 14. Consequently, in this embodiment, three paired scavenge ports 16, 17, and 18 are formed on the inner wall of the cylinder 4. The first scavenge ports 16, the first transfer passages 19, the second scavenge ports 17, and the second transfer passages 20 have the same construction as the same elements illustrated in FIG. 20, and the third scavenge ports 18 and the third transfer passages 21 have the same construction as the second scavenge ports 17 and the second transfer passages 20 illustrated in FIG. 14, respectively. Consequently, in this embodiment, when the piston 5 moves upward, a large amount of fuel is introduced into the lower passage 43, and a small amount of fuel is fed into the crankcase 1 via the upper passage 42. Then the fuel fed into the crankcase 1 is trapped by the vertical fuel-separating walls 54 and 55 and is introduced into the second transfer passages 20. Consequently, in this embodiment, a rich air-fuel mixture flows into the cylinder 4 from the third scavenge ports 18 as is illustrated by the arrow r in FIG. 26, and a lean air-fuel mixture flows into the cylinder 4 from the second scavenge ports 17 as is illustrated by the arrow s in FIG. 26. In addition, an extremely lean air-fuel mixture which is considerably leaner than the lean air-fuel mixture fed from the second scavenge ports 17 flows into the cylinder 4 from the first scavenge ports 16 as is illustrated by the arrow s' in FIG. 26. In this embodiment, the lean air-fuel mixture overlays the rich air-fuel mixture, and the extremely lean air-fuel mixture overlays the lean air-fuel mixture. Consequently, the rich air-fuel mixture is further prevented from flowing towards the exhaust port 15 and thus escaping into the exhaust passage 11.

FIGS. 29 through 64 illustrate various embodiments in which the third method illustrated in FIGS. 9 and 10 is put to practical use, and FIGS. 29 through 44 illustrate embodiments in which an air-fuel mixture is fed into the transfer passages from the crankcase and then a richer air-fuel mixture and a leaner air-fuel mixture are created in the transfer passages by separating fuel from the air-fuel mixture.

In the embodiment illustrated in FIGS. 29 through 33, only one pair of transfer passages 19 is provided, and the lower ends of the transfer passages 19 are open to the upper interior of the crankcase 1. Each of the transfer passages 19 has an arc shape in a vertical cross section thereof as illustrated in FIG. 30 and comprises an outer wall 19a, an inner wall 19b, a first side wall 19c located near the exhaust port 15, and a second side wall 19d located opposite the exhaust port 15. Each of the transfer passages 19 has a raised wall 60 which is formed on the corner at which the outer wall 19a and the first side wall 19c intersect each other. Each raised wall 60 has an approximately rectangular cross-sectional shape and extends from the corresponding scavenge port 16 half way to the corresponding transfer passage 19. In addition, each raised wall 60 has a width $h_1$ (FIG. 31) which is approximately one-half of the distance between the first side wall 19c and the second side wall 19d and a height $h_2$ (FIG. 31) which is approximately one-half of the distance between the outer wall 19a and the inner wall 19b. Each raised wall 60 has a uniform width $h_1$ over approximately the entire length thereof, and the width $h_1$ of the lower portion of each raised wall 60 is gradually reduced downwardly.

As was mentioned above, each of the transfer passages 19 has an arc shape in a vertical cross-section of the engine as is illustrated in FIG. 30. Consequently, when the piston 5 uncovers the scavenge ports 16, liquid fuel and an air-fuel mixture containing fine particles of fuel therein are caused to flow, while turning, within the transfer passages 19. Therefore, a centrifugal force acts on the liquid fuel and the air-fuel mixture, causing the liquid fuel and the fine particles of fuel to collect on the outer walls 19a of the transfer passages 19. At this time, as was mentioned above, since the liquid fuel and the fine particles of fuel are separated from the air-fuel mixture, the air-fuel mixture becomes lean. The liquid fuel and the fine particles of fuel flow upward between the second side wall 19d and the raised wall 60 and reach the scavenge ports 16. Since part of the liquid fuel is vaporized when the liquid fuel flows between the second side wall 19d and the raised wall 60, a rich air-fuel mixture is created on the second side wall 19a located opposite the exhaust port 15, and a lean air-fuel mixture is created on the first side wall 19c located near the exhaust port 15. Thus, the piston 5 uncovers the scavenge ports 16, the rich air-fuel mixture flows, together with the liquid fuel and the fine particles of fuel, into the cylinder 4 from a portion of the scavenge ports 16 located near the second side wall 19d as illustrated by the arrow r in FIG. 29. In addition, at this time, the lean air-fuel mixture flows into the cylinder 4 from a portion of the scavenge ports 16 located near the first side wall 19c as is illustrated by the arrow s in FIG. 29.

FIGS. 34 through 38 illustrate a modified embodiment of the two-stroke engine illustrated in FIGS. 29 through 33. In this embodiment, thin-walled ribs 61 are formed on the outer wall 19a of each of the transfer passages 19. Each rib 61 is centrally arranged between the first side wall 19c and the second side wall 19d, and the lower end of each rib 61 gradually approaches the first side wall 19c and is joined with the first side wall 19c. In addition, each rib 61 has a height which is approximately one-half of the distance between the outer wall 19a and the inner wall 19b. In this embodiment, in the same manner as in the embodiment illustrated in FIGS. 29 through 33, when the piston 5 uncovers the scavenge ports 16, the liquid fuel and the fine particles of fuel collect on the outer wall 19a between the rib 61 and the second side wall 19d. Consequently, a rich air-fuel mixture flows into the cylinder 4 from a portion of the scavenge ports 16 located remote from the exhaust port 15, as is illustrated by the arrow r in FIG. 34, and a lean air-fuel mixture flows into the cylinder 4 from a portion of the scavenge ports 16 located near the exhaust port 15, as is illustrated by the arrow s in FIG. 34.

Figure 39:
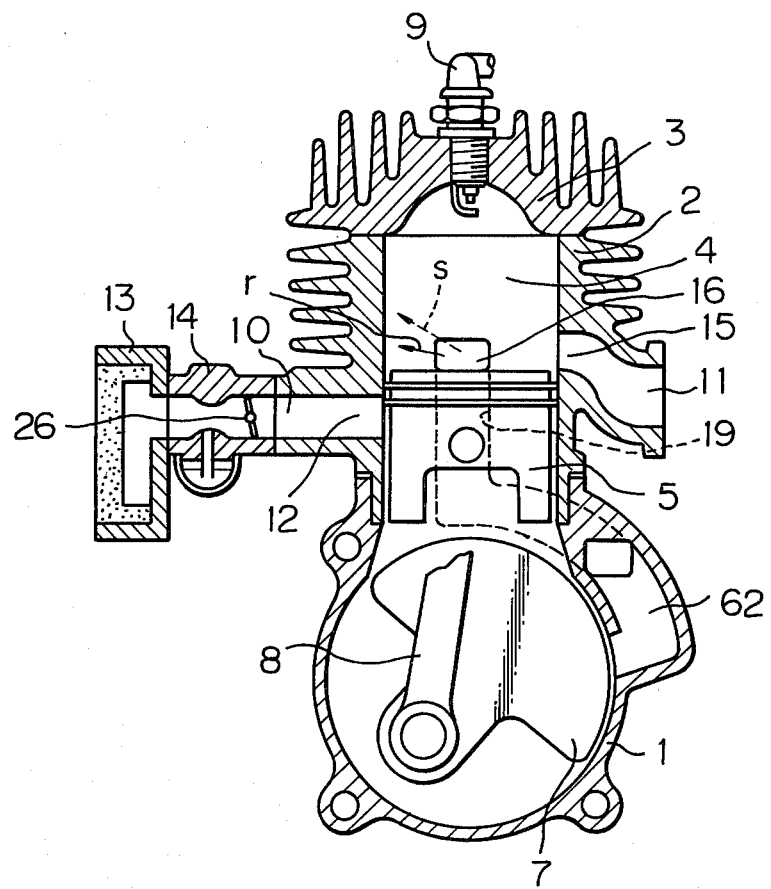
FIG. 39 is a cross-sectional side view of a further embodiment of a two-stroke engine according to the present invention.
Figure 40:
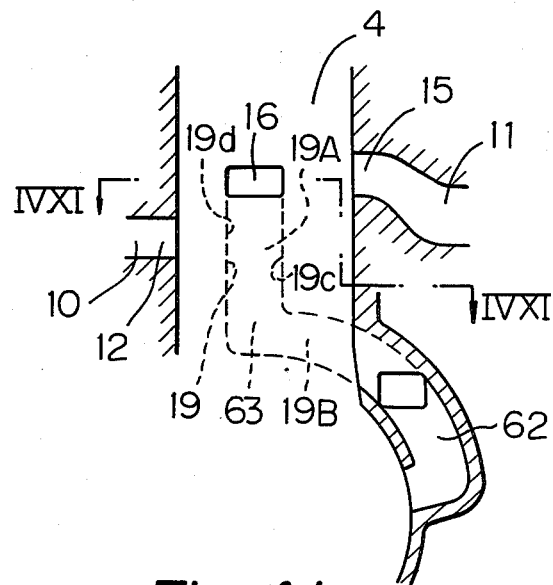
FIG. 40 is a cross-sectional side view of the engine of FIG. 39 with the piston removed.
Figure 41:
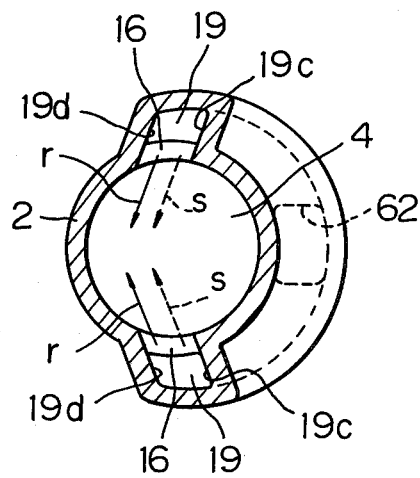
FIG. 41 is a cross-sectional side view of the engine of FIG. 40 taken along the line IVXI—IVXI in FIG. 40.

In the embodiment illustrated in FIGS. 39 through 41, the transfer passages 19 are joined to each other, and the joined portion thereof is connected to a single transfer passage 62. The single transfer passage 62 is connected to the interior of the crankcase 1. As can be seen from FIG. 40, each of the transfer passages 19 has a sharp turning portion 63. That is, each of the transfer passages 19 comprises a vertically-extending passage portion 19A and a passage portion 19B connected to the passage portion 19A at a right angle, and the sharp turning portion 63 is formed at the connecting portion of the passage portions 19A and 19B.

In this embodiment, when the piston 5 uncovers the scavenge ports 16, the air-fuel mixture in the crankcase 1, together with the liquid fuel and the fine particles of fuel, is forced into the transfer passages 19 via the transfer passage 62. Then, when the air-fuel mixture passes through the sharp turning portions 63, the liquid fuel and the fine particles of fuel impinge upon the second side walls 19d of the transfer passages 19 located opposite the exhaust port 15. As a result, the liquid fuel and the fine particles of fuel adhere to the second side walls 19d and then flow upward along the second side walls 19d. Since part of the liquid fuel is vaporized when the liquid fuel flows along the second side walls 19d, a rich air-fuel mixture is created near the second side walls 19d. Also, since the liquid fuel and the fine particles of fuel are separated from the air-fuel mixture flowing within the transfer passages 19, a lean air-fuel mixture is created near the first side walls 19c of the transfer passages 19 located near the exhaust port 15. Consequently, a rich air-fuel mixture flows, together with the liquid fuel and the fine particles of fuel, into the cylinder 4 from a portion of the scavange ports 16 located remote from the exhaust port 15, as is illustrated by the arrow r in FIG. 39, and a lean air-fuel mixture flows into the cylinder 4 from a portion of the scavenge ports 16 located near the exhaust port 15, as is illustrated by the arrow s in FIG. 39.

Figure 42:
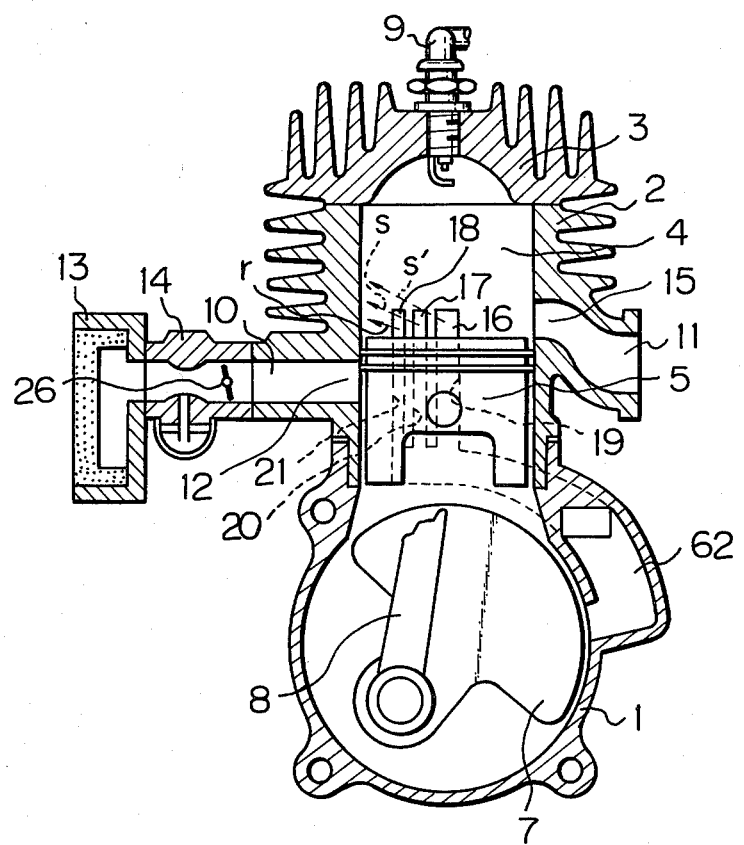
FIG. 42 is a cross-sectional side view of still a further embodiment of a two-stroke engine according to the present invention.
Figure 43:
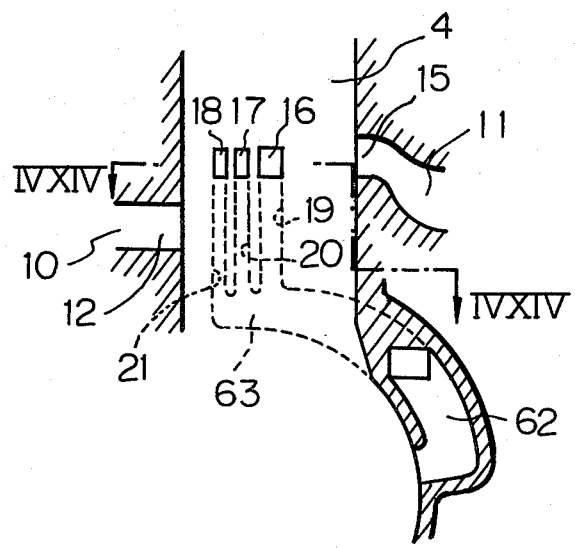
FIG. 43 is a cross-sectional side view of the engine of FIG. 42 with the piston removed.
Figure 44:
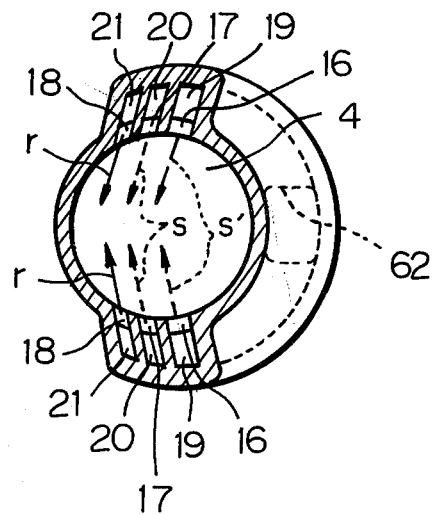
FIG. 44 is a cross-sectional side view of the engine of FIG. 43 taken along the line IVXIV—IVXIV in FIG. 43.

FIGS. 42 through 44 illustrate a modified embodiment of the two-stroke engine illustrated in FIGS. 39 through 41. In this embodiment, three paired scavenge ports 16, 17, and 18 and three paired transfer passages 19, 20 and 21 are provided, and the lower ends of the transfer passages 19, 20, and 21 are open to the sharp turning portions 63. In this embodiment, a large part of the liquid fuel and a large part of the fine particles of fuel is introduced into the third transfer passages 21, and a small part of the liquid fuel and a small part of the fine particles of fuel is introduced into the second transfer passages 20. Consequently, when the piston 5 uncovers the first scavenge ports 16, the second scavenge ports 17, and the third scavenge ports 18, a rich air-fuel mixture flows into the cylinder 4 from the third scavenge ports 18, as is illustrated by the arrows r in FIGS. 42 and 44, and a lean air-fuel mixture flows into the cylinder 4 from the second scavange ports 17, as is illustrated by the arrow s in FIGS. 42 and 44. In addition, at this time, an extremely lean air-fuel mixture flows into the cylinder 4 from the first scavenge ports 16, as is illustrated by the arrow s' in FIGS. 42 and 44.

FIGS. 45 through 56 illustrate various embodiments in which a rich air-fuel mixture and a lean air-fuel mixture are created in the transfer passage by using a fuel injector instead of a carburetor. Consequently, in these embodiments, no carburetor is provided.

Figure 45:
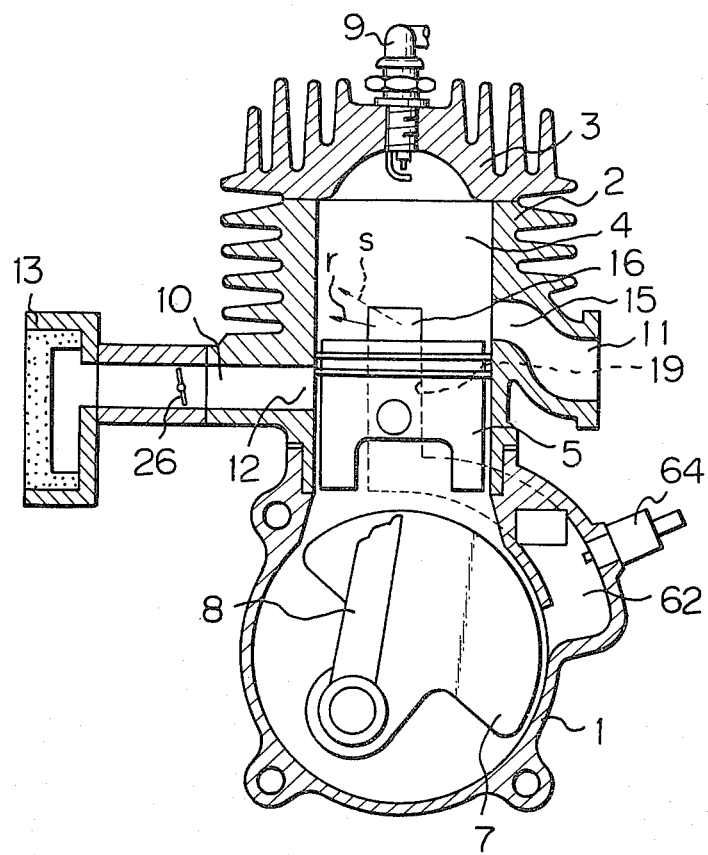
FIG. 45 is a cross-sectional side view of another embodiment of a two-stroke engine according to the present invention.
Figure 46:
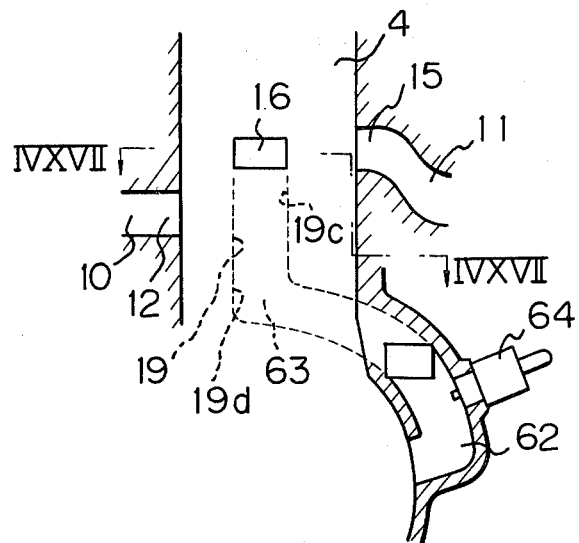
FIG. 46 is a cross-sectional side view of the engine of FIG. 45 with the piston removed.
Figure 47:
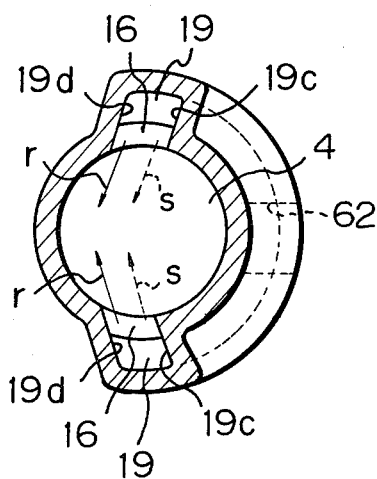
FIG. 47 is a cross-sectional side view of the engine of FIG. 46 taken along the line IVXVII—IVXVII in FIG. 46.

FIGS. 45 through 47 illustrate a modified embodiment of the two-stroke engine illustrated in FIGS. 39 through 41. In this embodiment, a fuel injector 64 is arranged in the transfer passage 62. When the piston 5 uncovers the scavenge ports 16, air under pressure in the crankcase 1 is forced into the transfer passage 62 and then fuel is injected into the air by the fuel injector 64. In this embodiment, in the same manner as in the embodiment illustrated in FIGS. 39 through 41, the liquid fuel and the fine particles of fuel impinge upon the second side walls 19d and flow upward along the second side walls 19d. Consequently, a rich air-fuel mixture flows into the cylinder 4 from a portion of the scavenge ports 16 located remote from the exhaust port 15, as is illustrated by the arrows r in FIGS. 45 and 47, and a lean air-fuel mixture flows into the cylinder 4 from a portion of the scavenge ports 16 located near the exhaust port 15, as is illustrated by the arrows s in FIGS. 45 and 47.

Figure 48:
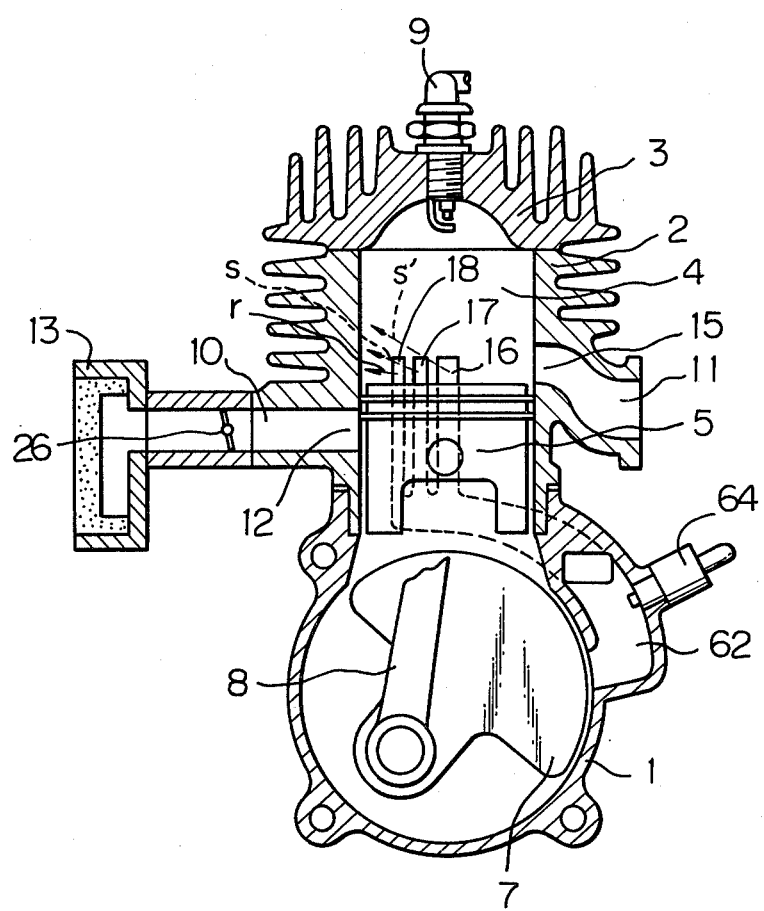
FIG. 48 is a cross-sectional side view of yet another embodiment of a two-stroke engine according to the present invention.
Figure 49:
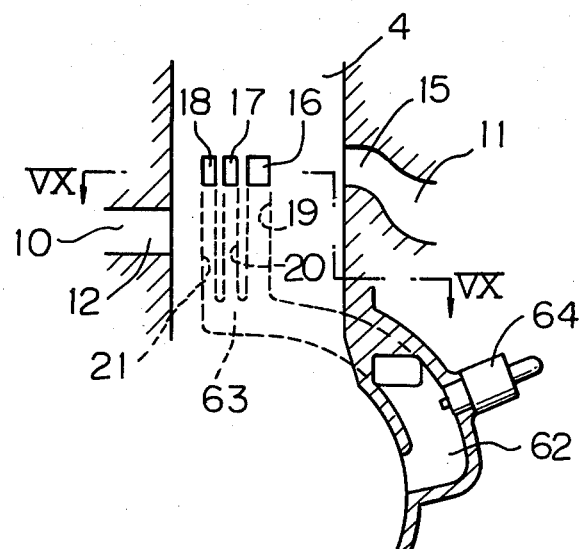
FIG. 49 is a cross-sectional side view of the engine of FIG. 48 with the piston removed.
Figure 50:
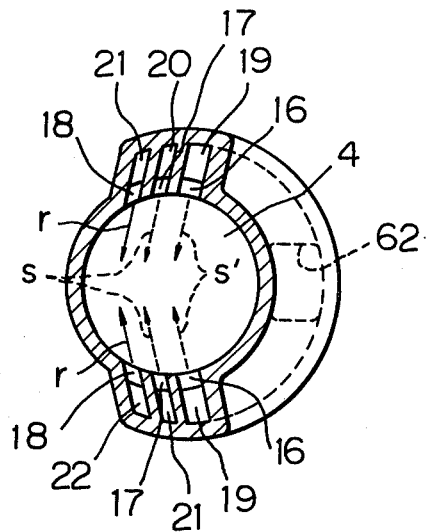
FIG. 50 is a cross-sectional side view of the engine of FIG. 49 taken along the line VX—VX in FIG. 49.

FIGS. 48 through 50 illustrate a modified embodiment of the two-stroke engine illustrated in FIGS. 42 through 44. In this embodiment, the fuel injector 64 is arranged in the transfer passage 62, and fuel is injected into the transfer passage 62 by the fuel injector 64. When the piston 5 uncovers the scavenge ports 16, 17, and 18, a large amount of the liquid fuel and a large amount of the fine particles of fuel flows into the third transfer passages 21, and a small amount of the liquid fuel and a small amount of the fine particles flows into the second transfer passages 20. Consequently, a rich air-fuel mixture flows into the cylinder 4 from the third scavenge ports 18 as is illustrated by the arrows r in FIGS. 48 and 50, and a lean air-fuel mixture flows into the cylinder 4 from the second scavenge ports 17 as is illustrated by the arrow s in FIGS. 48 and 50. In addition, an extremely lean air-fuel mixture flows into the cylinder 4 from the first scavenge ports 16 as is illustrated by the arrow s' in FIGS. 48 and 50.

Figure 51:
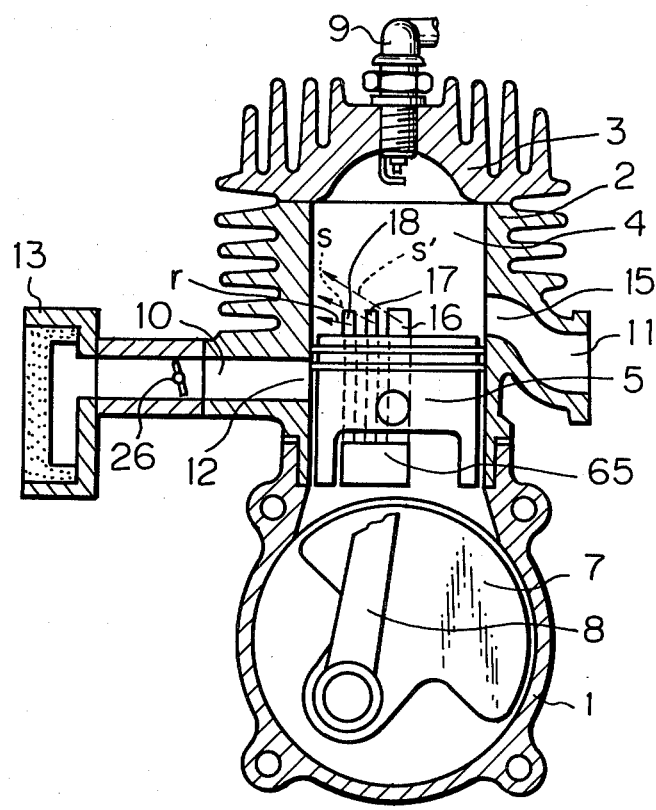
FIG. 51 is a cross-sectional side view of a further embodiment a two-stroke engine according to the present invention.
Figure 52:
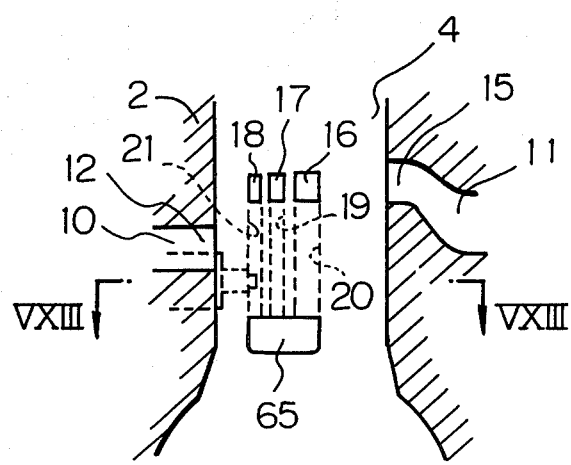
FIG. 52 is a cross-sectional side view of the engine of FIG. 51 with the piston removed.
Figure 53:
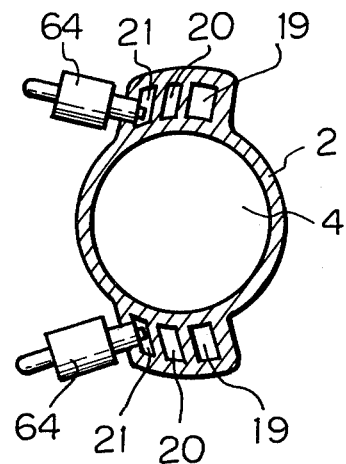
FIG. 53 is a cross-sectional side view of the engine of FIG. 52 taken along the line VXIII—VXIII in FIG. 52.

FIGS. 51 through 53 illustrate a further modified embodiment of the two-stroke engine illustrated in FIGS. 42 through 44. In this embodiment, the lower ends of the transfer passages 19, 20, and 21 are open to the interior of the crankcase 1 via openings 65 formed on the inner wall of the crankcase 1 beneath the scavenge ports 16, 17, and 18. In addition, fuel injectors 64 are arranged in the third transfer passages 21, and fuel is injected into the third transfer passages 21. Consequently, a rich air-fuel mixture is created in the third transfer passages 21. Therefore, in this embodiment, when the piston 5 uncovers the scavenge ports 16, 17, and 18, a rich air-fuel mixture flows into the cylinder 4 from the third scavenge ports 18 as is illustrated by the arrow r in FIG. 51, and air flows into the cylinder 4 from the first scavenge ports 16 and the second scavenge ports 17 as is illustrated by the arrows s' and s, respectively.

Figure 54:
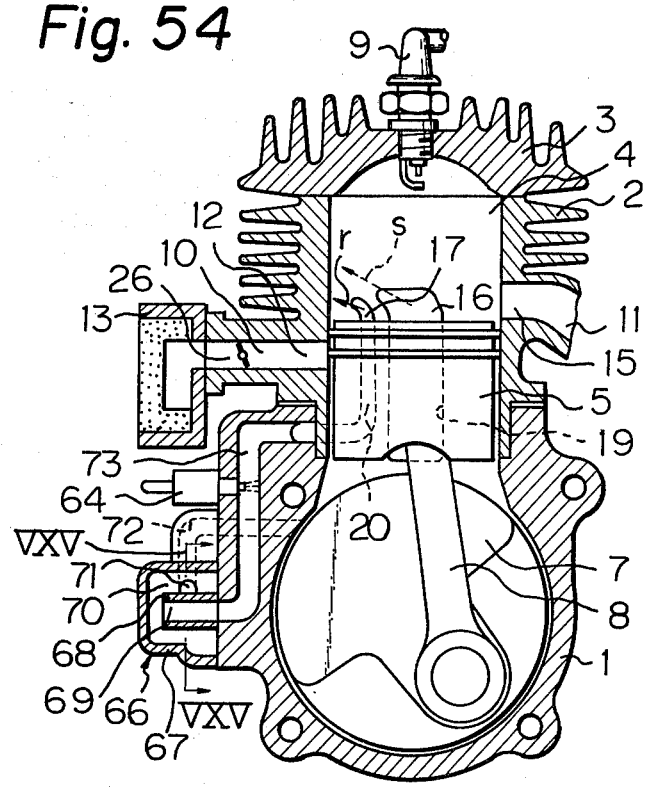
FIG. 54 is a cross-sectional side view of still a further embodiment of a two-stroke engine according to the present invention.
Figure 55:
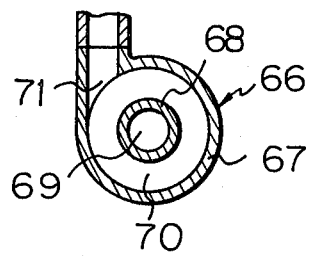
FIG. 55 is a cross-sectional side view of the fuel return-preventing device of FIG. 54, taken along the line VXV—VXV in FIG. 54.

In the embodiment illustrated in FIGS. 54 and 55, a fuel return-preventing device 66 is attached to the crankcase 1. The construction of the fuel return-preventing device 66 is almost the same as that of the air-fuel mixture separator 44 illustrated in FIGS. 15 and 16. Thus, a detailed explanation regarding the construction of the fuel return-preventing device 66 is omitted here. As is illustrated in FIGS. 54 and 55, the fuel return-preventing device 66 comprises a cylindrical outer casing 67, a hollow pipe 68, a passage 69 formed in the hollow pipe 68, an annular vortex chamber 70 formed between the hollow pipe 68 and the cylindrical outer casing 67, and an air inlet 71 tangentially connected to the inner circumferential wall of the cylindrical outer casing 67. The air inlet 71 is connected to the interior of the crankcase 1 via an air passage 72. The passage 69 of the hollow pipe 68 is connected to the second transfer passages 20 via a passage 73, and the fuel injector 64 is arranged in the passage 73. In this embodiment, when the piston 5 uncovers the first scavenge ports 16, air under pressure in the crankcase 1 is introduced into the first scavenge ports 16 via the first transfer passages 19 and then flows into the cylinder 4 from the first scavenge ports 16 as is illustrated by the arrow s in FIG. 54. Then, when the piston 5 uncovers the second scavenge ports 17, air under pressure in the crankcase 1 is forced into the vortex chamber 70 and then enters the passage 73 via the passage 69 of the hollow pipe 68. At this time, since fuel is injected by the fuel injector 64 into the air flowing within the passage 73, a rich air-fuel mixture is created in the passage 73. The rich air-fuel mixture is introduced to the second scavenge ports 17 via the second transfer passages 20 and then flows into the cylinder 4 from the second scavenge ports 17 as is illustrated by the arrow r in FIG. 54.

In the two-stroke engine illustrated in FIG. 54, the pressure in the crankcase 1 is alternately increased and decreased due to the reciprocal motion of the piston 5. Consequently, when the pressure in the crankcase 1 is decreased, there is the danger that the air-fuel mixture remaining in the passage 73 and the second transfer passages 20 will be sucked into the crankcase 1. However, in the embodiment illustrated in FIGS. 54 and 55, when the pressure in the crankcase 1 is decreased, and thus the air-fuel mixture in the passage 73 and the second transfer passages 20 reversely flows towards the interior of the crankcase 1, the liquid fuel contained in the air-fuel mixture impinges upon the inner wall of the outer casing 67 and adheres thereonto. Therefore, the amount of fuel which enters the crankcase 1 is extremely small. As a result, since the amount of fuel contained in the air which flows out of the first scavenge ports 16 is extremely small, the amount of fuel which escapes into the exhaust passage 11 is extremely small.

Figure 56:
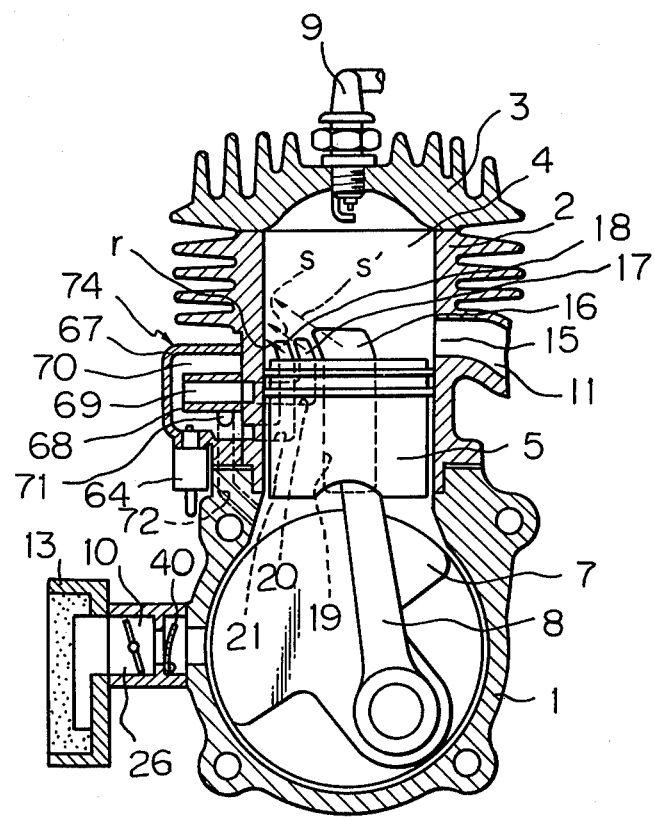
FIG. 56 is a cross-sectional side view of another embodiment of a two-stroke engine according to the present invention.

In the embodiment illustrated in FIG. 56, an air-fuel mixture separator 74 is attached to the cylinder block 2. The construction of the air-fuel mixture separator 74 is almost the same as that of the fuel return-preventing device 66 illustrated in FIGS. 54 and 55. Thus, the components of the air-fuel mixture separator 74 are indicated by the same reference numerals used in FIGS. 54 and 55. In this embodiment, the fuel in ector 64 is arranged in the vortex chamber 70. In addition, the bottom of the vortex chamber 70 is connected to the third transfer passages 21, and the passage 69 formed in the hollow pipe 68 is connected to the second transfer passages 20. In this embodiment, when the piston 5 uncovers the first scavenge ports 16, air under pressure in the crankcase 1 flows into the cylinder 4 from the first scavenge ports 16, as is illustrated by the arrow s' in FIG. 56. Then, when the piston 5 uncovers the second scavenge ports 17 and the third scavenge ports 18, air under pressure in the crankcase 1 is forced into the vortex chamber 70 from the air inlet 71 via the air passage 72. The air fed into the vortex chamber 70 swirls along the inner circumferential wall of the vortex chamber 70, and fuel is injected into the swirling air by the fuel injector 64. Consequently, a centrifugal force acts on the fuel due to the swirling motion of the air, and, thus, the fuel adheres to the inner circumferential wall of the vortex chamber 70. Then the fuel collects on the bottom of the vortex chamber 70 and is introduced into the third transfer passages 21. At this time, since a large part of the fuel injected by the fuel injector 64 collects on the bottom of the vortex chamber 70, the amount of fuel introduced into the second transfer passages 20 via the passage 69 of the hollow pipe 68 is small. Consequently, when the piston 5 uncovers the second scavenge ports 17 and the third scavenge ports 18, a rich air-fuel mixture flows into the cylinder 4 from the third scavenge ports 18 as is illustrated by the arrow r in FIG. 56, and a lean air-fuel mixture flows into the cylinder 4 from the second scavenge ports 17 as is illustrated by the arrow s in FIG. 56.

In this embodiment, since the air-fuel mixture separator 74 is attached to the cylinder block 2, the air-fuel mixture separator 74 is heated by the heat of combustion. Consequently, there is an advantage in that the vaporization of fuel injected by the fuel injector 64 is promoted.

Figure 57:
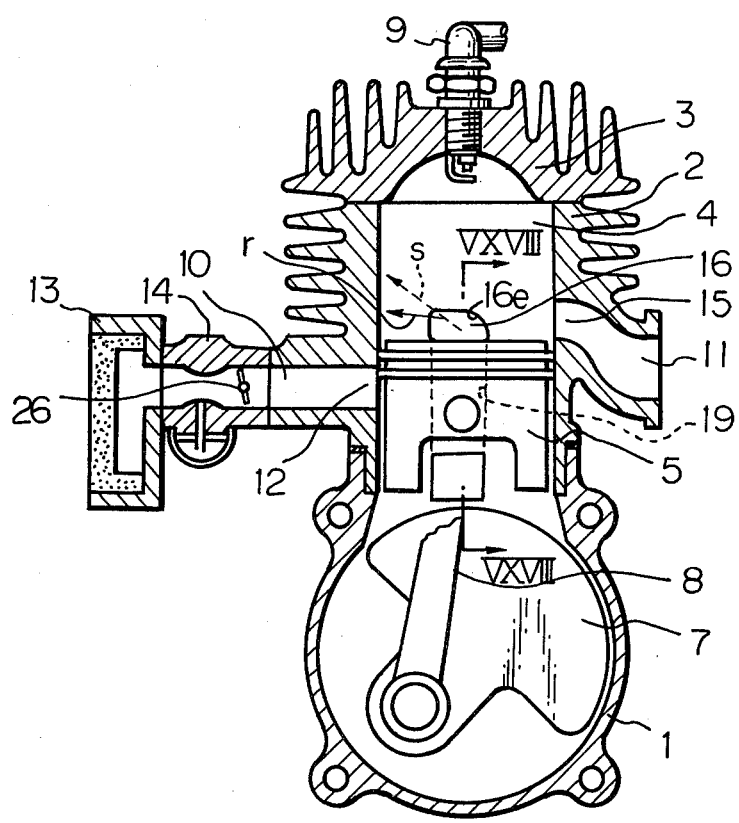
FIG. 57 is a cross-sectional side view of yet another embodiment of a two-stroke engine according to the present invention.
Figure 58:
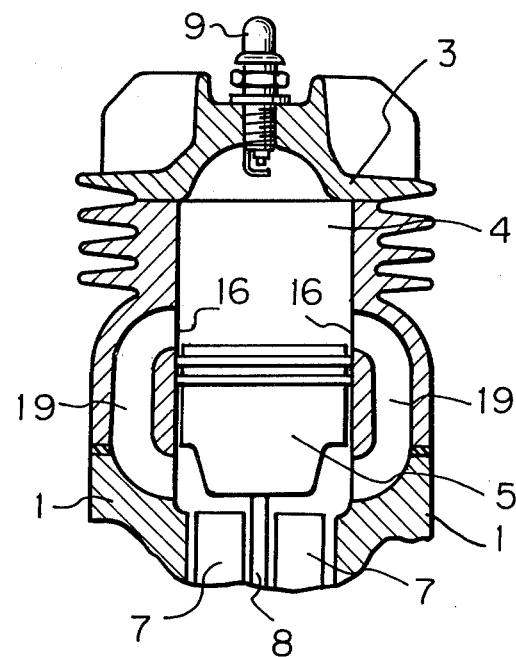
FIG. 58 is a cross-sectional side view of the engine of FIG. 57 taken along the line VXVIII—VXVIII in FIG. 57.
Figure 59:
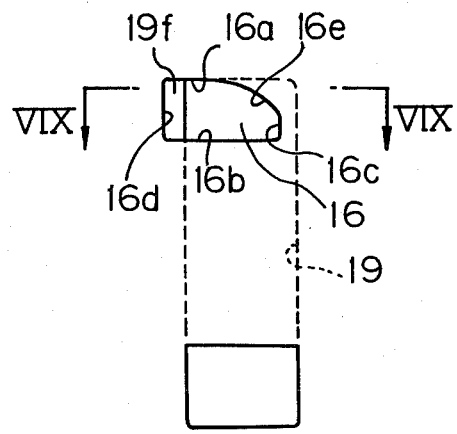
FIG. 59 is an enlarged view of the inner wall of the cylinder of FIG. 57 in which only the scavenge port and the transfer passage are illustrated.
Figure 60:
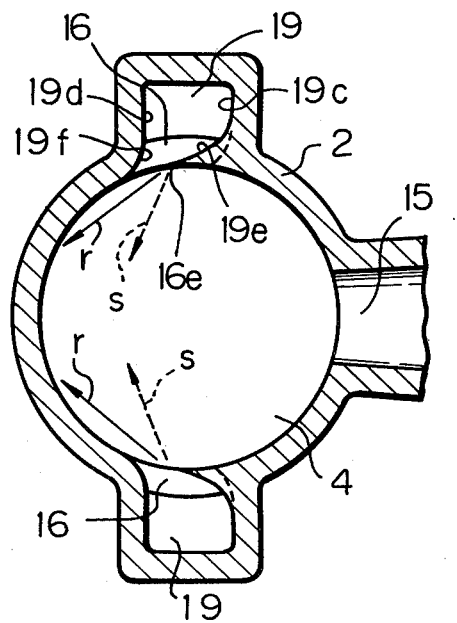
FIG. 60 is a cross-sectional side view of the engine of FIG. 59 taken along the line VIX—VIX in FIG. 59.
Figure 61:
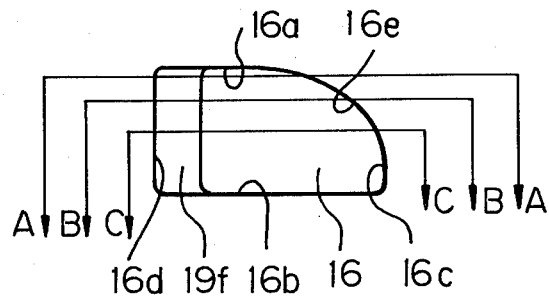
FIG. 61 is an enlarged view of the scavenge port illustrated in FIG. 59.

FIGS. 57 through 64 illustrate embodiments in which fuel fed from the carburetor 14 is introduced into the interior of the crankcase 1 and then is separated from the air-fuel mixture at the scavenge ports 16. In the embodiment illustrated in FIGS. 57 through 62, only one pair of scavenge ports 16 is formed on the inner wall of the cylinder 4 and connected to the interior of the crankcase 1 via the corresponding transfer passages 19. FIG. 59 illustrates the scavenge port 16 and the transfer passage 19 depicted in FIG. 57, and FIG. 60 illustrates a cross-sectional view of the cylinder block 2. In addition, FIG. 61 illustrates only one scavenge port 16, and FIG. 62 illustrates cross-sectional views of the scavenge port 16. That is, in FIG. 62, (A) illustrates a cross-sectional view of the scavenge port 16 taken along the line A-A in FIG. 61, (B) illustrates a cross-sectional view of the scavenge port 16 taken along the line B-B in FIG. 61, and (c) illustrates a cross-sectional view of the scavenge port 16 taken along the line C-C in FIG. 61. As is illustrated in FIGS. 57, 59, and 61, in this embodiment, the scavenge port 16 does not have a rectangular shape. That is, the left half of the upper edge 16a of the scavenge port 16 and the lower edge 16b of the scavenge port 16 extend horizontally, and the lower half of the side edge 16c of the scavenge port 16 and the side edge 16d of the scavenge port 16 extend vertically. However, the right end of the upper edge 16a and the top of the side edge 16c are interconnected by a curved edge 16e. In addition, the first side wall 19c of the transfer passage 19 is connected to the curved edge 16e and the side edge 16c via a cruved wall 19e, and the second side wall 19d of the transfer passage 19 is connected to the side edge 16d via a curved wall 19f. As will be understood from FIGS. 61 and 62, the radius of curvature of the curved wall 19c decreases as the curved wall 19e approaches the upper edge 16a.

Figure 62A:
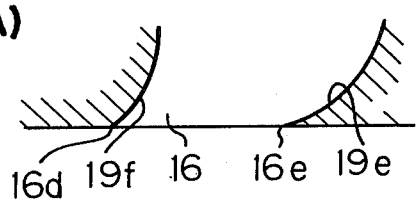
FIG. 62 is a cross-sectional side view of the scavenge port of FIG. 61 in which various cross sections taken along the lines A—A, B—B, and C—C in FIG. 61 are illustrated.
Figure 62B:
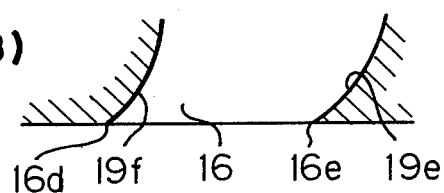
Figure 62C:
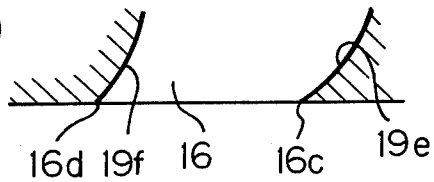

In this embodiment, when the piston 5 slightly uncovers the scavenge ports 16, the air-fuel mixture under pressure in the crankcase 1 begins to flow into the cylinder 4 from the scavenge ports 16 via the transfer passages 19. At this time, the air-fuel mixture passes through the flow path formed between the curved walls 19e and 19f illustrated in FIG. 62(A) and then flows into the cylinder 4. Consequently, at this time, a large part of the air-fuel mixture impinges upon the curved wall 19e and then flows, while curving, along the curved wall 19e. As a result, since a centrifugal force acts on the air-fuel mixture, the liquid fuel and the fine particles of fuel adhere to the curved wall 19e. Then the liquid fuel and the fine particles of fuel flow into the cylinder 4 in a tangent direction of the curved wall 19e and thus move forward towards the inner wall of the cylinder 4 located opposite the exhaust port 15, as is illustrated by the arrows r in FIGS. 57 and 60. Consequently, a rich air-fuel mixture is formed near the inner wall of the cylinder 4. At this time, the air-fuel mixture flows into the cylinder 4 without curving very much due to the inertia force illustrated by the arrows s in FIGS. 57 and 60. When the piston 5 further uncovers the scavenge ports 16 as is illustrated in FIG. 62(B) and FIG. 62(C), the fuel adhering to the curved wall 19e flows in a tangent direction of the curved wall 19e towards the inner wall of the cylinder 4, and the flow direction of the air-fuel mixture is gradually changed so that the angle of the flow direction with respect to a line passing through both of the scavenge ports 16 becomes small. Since the fuel is separated from the air-fuel mixture at the scavenge ports 16, the air-fuel mixture which flows into the cylinder 4 is lean. Consequently, the air-fuel mixture in the cylinder 4 is stratified so that the lean air-fuel mixture overlays the rich air-fuel mixture.

Figure 63:
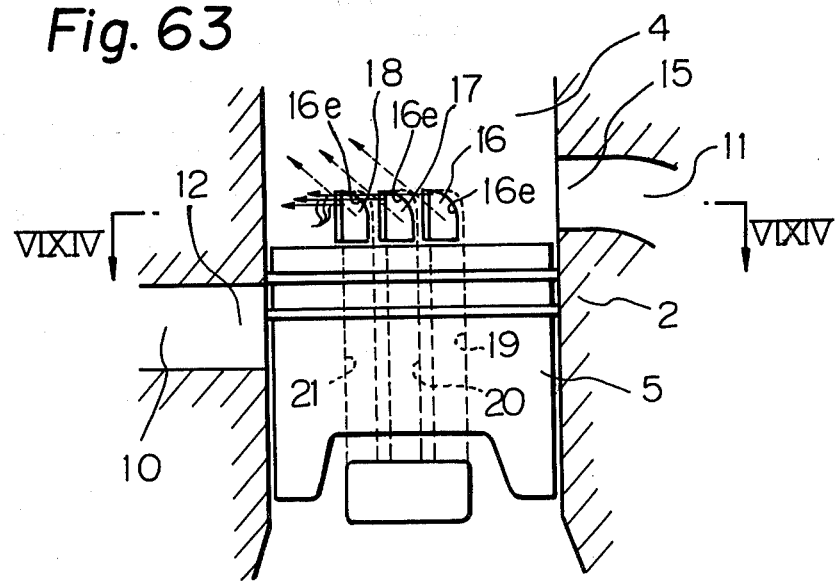
FIG. 63 is a cross-sectional side view of a further embodiment of a two-stroke engine according to the present invention.

FIGS. 63 and 64 illustrate a modified embodiment of the two-stroke engine illustrated in FIGS. 57 through 62. In this embodiment, three paired scavenge ports 16, 17, and 18 are formed on the inner wall of the cylinder 4, and each of the scavenge ports 16, 17, and 18 has a shape which is the same as that of the scavenge ports 16 illustrated in FIGS. 57 through 62. That is, each of the scavenge ports 16, 17, and 18 has a curved edge 16e and a curved wall 19e near the exhaust port 15. Therefore, when the piston 5 uncovers the scavenge ports 16, 17, and 18, the fuel adhering to the curved walls 19e flows into the cylinder 4 in a tangent direction of the scavenge ports 16, 17, and 18 towards the inner wall of the cylinder 4 as is illustrated by the arrows r in FIGS. 63 and 64. In addition, at this time, a lean air-fuel mixture flows into the cylinder 4 without curving very much due to the inertia force illustrated by the arrows s in FIGS. 63 and 64. Consequently, the air-fuel mixture in the cylinder 4 is stratified so that the lean air-fuel mixture overlays the rich air-fuel mixture.

According to the present invention, since a richer air-fuel mixture is prevented from escaping into the exhaust passage by air or a leaner air-fuel mixture, the amount of fuel which escapes into the outside air is considerably reduced as compared with that in a conventional two-stroke engine, thereby making it possible to reduce fuel consumption and the amount of unburnt HC in the exhaust gas. In the experiments conducted by the inventors, it was confirmed that according to the present invention fuel consumption is reduced by about 30 percent and the amount of unburnt HC in the exhaust gas is reduced by 50 percent as compared with a conventinal two-stroke engine. In addition, it was confirmed that even if kerosene or alcohol is used instead of gasoline, operation of the engine is stable.

While the invention has been described with reference to specific embodiments chosen for purposes of illustration, it should be apparent that numerous modifications could be made thereto by those skilled in the art without departing from the basic concept and scope of the invention.

We claim:

1. A two-stroke internal-combustion engine comprising:
   a cylinder block having a cylinder therein;
   a piston reciprocally movable in said cylinder, said cylinder having an inner wall which has a scavenge port and an exhaust port formed therein and being alternately covered and uncovered by said piston;
   a crankcase having therein an interior chamber, the pressure in said interior chamber being alternately increased and decreased due to the reciprocal motion of said piston;
   an intake passage having an air inlet and being connected to the interior chamber of said crankcase;
   a transfer passage interconnecting the interior chamber of said crankcase and said scavenge port, outside air being fed into said cylinder via an air passage defined by said intake passage, the interior chamber of said crankcase, and said transfer passage;
   fuel supply means arranged in said air passage for feeding fuel into said air passage so as to create an air-fuel mixture therein; and
   fuel-separating means arranged in said air passage for separating fuel from said air-fuel mixture so as to create a richer air-fuel mixture and a leaner air-fuel mixture, said scavenge port having such a construction that said rich air-fuel mixture flows into said cylinder towards the inner wall of said cylinder located opposite said scavenge port.

2. A two-stroke internal-combustion engine according to claim 1, wherein said air inlet is a single air inlet.

3. A two-stroke internal-combustion engine according to claim 1, wherein said fuel supply means and said fuel-separating means are arranged in said intake passage for separating the fuel from the air-fuel mixture in said intake passage so as to create a richer air-fuel mixture and a leaner air-fuel mixture, said transfer passage comprising a first transfer passage and a second transfer passage for separately introducing said richer air-fuel mixture and said leaner air-fuel mixture into said scavenge port, respectively.

4. A two-stroke internal-combustion engine according to claim 3, wherein said scavenge port comprises a pair of first scavenge ports and a pair of second scavenge ports located opposite said exhaust port with respect to said first scavenge ports, said first transfer passage being connected to said first scavenge ports and said second transfer passage being connected to said second scavenge ports.

5. A two-stroke internal-combustion engine according to claim 4 wherein said first scavenge ports have an upper edge which is located above the upper edges of said second scavenge ports.

6. A two-stroke internal-combustion engine according to claim 3, wherein said fuel supply means is a carburetor comprising a main fuel nozzle arranged in said intake passage, said fuel-separating means comprising a main fuel trapper which is arranged in said intake passage downstream of said main nozzle and which is connected to said second transfer passage for feeding fuel trapped by said main fuel trapper into said second transfer passage.

7. A two-stroke internal-combustion engine according to claim 6, wherein a check valve is arranged between said main fuel trapper and said second transfer passage for permitting only the flow of fuel from said main fuel trapper into said second transfer passage.

8. A two-stroke internal-combustion engine according to claim 6, wherein said carburetor comprises a slow fuel port and an idle port which are open to said intake passage and said fuel-separating means comprises an auxiliary fuel trapper arranged in said intake passage downstream of said slow fuel port and said idle port and connected to said second transfer passage for feeding fuel trapped by said auxiliary fuel trapper into said second transfer passage.

9. A two-stroke internal-combustion engine according to claim 6, wherein said second transfer passage is connected at one end thereof to said scavenge port and is connected at the other end thereof to the bottom of said interior chamber of said crankcase.

10. A two-stroke internal-combustion engine according to claim 3, wherein said fuel-separating means comprises a check valve arranged in said intake passage and a separating wall arranged in said intake passage downstream of said check valve, said separating wall extending in an axial direction of said intake passage and dividing said intake passage into an upper passage portion and a lower passage portion connected to said second transfer passage, said upper passage portion being connected to the interior chamber of said crankcase.

11. A two-stroke internal-combustion engine according to claim 10, wherein said check valve is a reed valve having an upper end fixed onto an upper wall of said intake passage.

12. A two-stroke internal-combustion engine according to claim 3, wherein said fuel-separating means comprises a check valve arranged in said intake passage and a centrifugal-type air-fuel mixture separator arranged in said intake passage downstream of said check valve.

13. A two-stroke internal-combustion engine according to claim 12, wherein said air-fuel mixture separator comprises a cylindrical vortex chamber, a lean air-fuel mixture passage interconnecting the interior chamber of said crankcase and the center of said vortex chamber, a mixture inlet tangentially connected to a cylindrical inner wall of said vortex chamber, and a fuel outlet formed on the cylindrical inner wall of said vortex chamber and connected to said second transfer passage, said mixture inlet being connected to said intake passage.

14. A two-stroke internal-combustion engine according to claim 13, wherein said air-fuel mixture separator comprises a hollow pipe coaxially arranged in said cylindrical vortex chamber, said lean air-fuel mixture passage being formed in said hollow pipe and having an end which is open to said vortex chamber.

15. A two-stroke internal-combustion engine according to claim 13, wherein said fuel outlet is formed on the bottom of said vortex chamber.

16. A two-stroke internal-combustion engine according to claim 1, wherein said fuel supply means is arranged in said intake passage and said fuel-separating means is arranged in the interior chamber of said crankcase for separating the fuel from the air-fuel mixture in said crankcase so as to create a richer air-fuel mixture and a leaner air-fuel mixture, said transfer passage comprising a first transfer passage and a second transfer passage for separately introducing the richer air-fuel mixture and the leaner air-fuel mixture into said scavenge port.

17. A two-stroke internal-combustion engine according to claim 16, wherein said scavenge port comprises a pair of first scavenge ports and a pair of second scavenge ports located opposite said exhaust port with respect to said first scavenge ports, said first transfer passage being connected to said first scavenge ports and said second transfer passage being connected to said second scavenge ports.

18. A two-stroke internal-combustion engine according to claim 17, wherein said first scavenge ports have an upper edge which is located above the upper edges of said second scavenge ports.

19. A two-stroke internal-combustion engine according to the claim 16, wherein said fuel-separating means comprises a fuel inlet formed on the bottom of the interior chamber of said crankcase and connected to said second transfer passage and a lean air-fuel mixture inlet connected to said first transfer passage and being open to the interior chamber of said crankcase above said fuel inlet.

20. A two-stroke internal-combustion engine according to claim 16, wherein said fuel-separating means comprises a separating wall arranged in the interior chamber of said crankcase near a cylindrical inner wall of said interior chamber, which cylindrical inner wall circumferentially extends about the crankshaft of the engine, for trapping fuel flowing on the cylindrical inner wall of said interior chamber, said second transfer passage being open to said interior chamber near said separating wall for introducing the fuel trapped by said separating wall into said second transfer passage.

21. A two-stroke internal-combustion engine according to claim 20, wherein said separating wall extends substantially in parallel to the crankshaft of the engine.

22. A two-stroke internal-combustion engine according to claim 21, further comprising a balance weight fixed onto the crankshaft and a connecting rod interconnecting the crankshaft and said piston, said separating wall being arranged near an upper end of said balance weight and extending to near said connecting rod.

23. A two-stroke internal-combustion engine according to claim 20, wherein a recess is formed on a side wall of said interior chamber, which side wall extends perpendicular to the crankshaft, said separating wall being arranged in said recess and dividing said recess into a first recess portion and a second recess portion which are open to said interior chamber on each side of said separating wall, said second transfer passage being open to said second recess portion.

24. A two-stroke internal-combustion engine according to claim 23, wherein said first transfer passage is open to said first recess portion.

25. A two-stroke internal-combustion engine according to claim 23, wherein a fuel inlet is formed on the cylindrical inner wall of said interior chamber remote from said second recess portion, said fuel inlet being connected to said second recess portion via a fuel passage.

26. A two-stroke internal-combustion engine according to claim 1, wherein said fuel supply means is arranged in said intake passage and said fuel-separating means is arranged in said transfer passage for separating the fuel from the air-fuel mixture so as to feed a richer air-fuel mixture into said cylinder from a portion of said scavenge port located remote from said exhaust port and a leaner air-fuel mixture into said cylinder from a portion of said scavenge port located near said exhaust port.

27. A two-stroke internal-combustion engine according to claim 26, wherein said scavenge port comprises an upper edge, a lower edge, a first side edge located near said exhaust port, and a second side edge located remote from said exhaust port and said transfer passage comrises an outer wall connected to said upper edge, an inner wall connected to said lower edge, a first side wall connected to said first side edge and located near said exhaust port, and a second side wall connected to said second side edge and located remote from said exhaust port, said fuel-separating means being arranged so as to collect the separated fuel on the second side wall of said transfer passage and create a richer air-fuel mixture on said second side wall, said richer air-fuel mixture being fed into said cylinder from a portion of said scavenge port located near the second side edge thereof.

28. A two-stroke internal-combustion engine according to claim 27, wherein said fuel-separating means comprises a raised wall formed on a corner at which said first side wall intersects said second outer wall and extending downwardly from said scavenge port.

29. A two-stroke internal-combustion engine according to claim 28, wherein said raised wall has a rectangular cross section over approximately the entire length thereof.

30. A two-stroke internal-combustion engine according to claim 27, wherein said raised wall has a width which is approximately one half of the distance between said first side wall and said second side wall, the width of the lower portion of said raised wall being gradually reduced downwardly.

31. A two-stroke internal-combustion engine according to claim 27, wherein said raised wall has a height which is approximately one half of the distance between said outer wall and said inner wall.

32. A two-stroke internal-combustion engine according to claim 27, wherein said fuel-separating means comprises a rib formed on said outer wall and extending downwardly from said scavenge port, said rib being centrally arranged between said first side wall and said second side wall and having a lower portion which gradually approaches said first side wall.

33. A two-stroke internal-combustion engine according to claim 32, wherein said rib has a height which is approximately one half of the distance between said outer wall and said inner wall.

34. A two-stroke internal-combustion engine according to claim 27, wherein said transfer passage comprises a sharply turning portion and a passage portion arranged between said sharply turning portion and the interior chamber of said crankcase and extending away from said second side wall, said fuel-separating means being formed by said sharply turning portion and said passage portion.

35. A two-stroke internal-combustion engine according to claim 26, wherein said scavenge port comprises at least two scavenge ports, i.e., a first scavenge port and a second scavenge port, said second scavenge port being located opposite said exhaust port with respect to said first scavenge port, and said transfer passage comprises a passage portion connected to the interior chamber of said crankcase, a first transfer passage arranged between said first scavenge port and said passage portion, and a second passage portion arranged between said second scavenge port and said passage portion, said fuel-separating means being arranged so as to collect the separated fuel in said second transfer passage and create a richer air-fuel mixture in said second transfer passage, said richer air-fuel mixture being fed into said cylinder from said second scavenge port.

36. A two-stroke internal-combustion engine according to claim 35, wherein said passage portion has a sharply turning portion to which said first transfer passage and said second transfer passage are open, said passage portion extending away from said second transfer passage and said fuel-separating means being formed by said sharply turning portion and said passage portion.

37. A two-stroke internal-combustion engine according to claim 1, wherein said fuel supply means and said fuel-separating means are arranged in said transfer passage for separating the fuel from the air-fuel mixture so as to feed the richer air-fuel mixture into said cylinder from a portion of said scavenge port located remote from said exhaust port and feed the leaner air-fuel mixture into said cylinder from a portion of said scavenge port located near said exhaust port.

38. A two-stroke internal-combustion engine according to claim 37, wherein said fuel supply means is a fuel in ector.

39. A two-stroke internal-combustion engine according to claim 37, wherein said scavenge port comprises an upper edge, a lower edge, a first side edge located near said exhaust port, and a second side edge located remote from said exhaust port and said transfer passage comprises an outer wall connected to said upper edge, an inner wall connected to said lower edge, a first side wall connected to said first side edge and located near said exhaust port, and a second side wall connected to said second side edge and located remote from said exhaust port, said fuel-separating means being arranged so as to collect the separated fuel on the second side wall of said transfer passage and create a richer air-fuel mixture on said second side wall, said richer air-fuel mixture being fed into said cylinder from a portion of said scavenge port located near the second side edge thereof.

40. A two-stroke internal-combustion engine according to claim 39, wherein said transfer passage comprises a sharply turning portion and a passage portion arranged between said sharply turning portion and the interior chamber of said crankcase and extending away from said second side wall, said fuel supply means being arranged in said passage portion and said fuel-separating means being formed by said sharply turning portion and said passage portion.

41. A two-stroke internal-combustion engine according to claim 37, wherein said scavenge port comprises at least two scavenge ports, i.e., a first scavenge port and a second scavenge port, said second scavenge port being located opposite said exhaust port with respect to said first scavenge port, and said transfer passage comprises a passage portion connected to the interior chamber of said crankcase, a first transfer passage arranged between said first scavenge port and said passage portion, and a second passage portion arranged between said second scavenge port and said passage portion, said fuel-separating means being arranged so as to collect the separated fuel in said second transfer passage and create a richer air-fuel mixture in said second transfer passage, said richer air-fuel mixture being fed into said cylinder from said second scavenge port.

42. A two-stroke internal-combustion engine according to claim 41, wherein said passage portion has a sharply turning portion to which said first transfer passage and said second transfer passage are open, said passage portion extending away from said second transfer passage, said fuel supply means being arranged in said passage portion, and said fuel-separating means being formed by said sharply turning portion and said passage portion.

43. A two-stroke internal-combustion engine according to claim 37, wherein said scavenge port comprises at least two scavenge ports, i.e., a first scavenge port and a second scavenge port, said second scavenge port being located opposite said exhaust port with respect to said first scavenge port and said transfer passage comprises a first transfer passage interconnecting said first scavenge port and the interior chamber of said crankcase and a second transfer passage interconnecting said second scavenge port and said interior chamber, said fuel supply means being arranged in said second transfer passage.

44. A two-stroke internal-combustion engine according to claim 43, wherein a fuel return-preventing device is arranged in said transfer passage and said fuel supply means is arranged between said fuel return-preventing device and said second scavenge port.

45. A two-stroke internal-combustion engine according to claim 44, wherein said fuel return-preventing device comprises a cylindrical vortex chamber, an outlet passage connected to said second scavenge port via said second transfer passage and being open to the center of said vortex chamber, and an inlet connected at one end thereof to said interior chamber and tangentially connected at the other end thereof to a cylindrical inner wall of said vortex chamber.

46. A two-stroke internal-combustion engine according to claim 45, wherein said fuel return-preventing device comprises a hollow pipe coaxially arranged in said cylindrical vortex chamber, said outlet passage being formed in said hollow pipe and having an end which is open to said vortex chamber.

47. A two-stroke internal-combustion engine according to claim 43, wherein said scavenge port further comprises a third scavenge port which is located opposite said exhaust port with respect to said second scavenge port and said transfer passage further comprises a third transfer passage branched from said second transfer passage and connected to said third scavenge port, said fuel supply means being arranged at the branching portion of said third transfer passage.

48. A two-stroke internal-combustion engine according to claim 47, wherein an air-fuel mixture separator is arranged in said second transfer passage at said branching portion and comprises a cylindrical vortex chamber, an outlet passage connected to said second scavenge port via said second transfer passage and being open to the center of said vortex chamber, an outlet port connected to said third scavenge port via said third transfer passage and being open to said vortex chamber, and an inlet connected on one end thereof to said interior chamber and tangentially connected at the other end thereof to a cylindrical inner wall of said vortex chamber, said fuel supply means being arranged in said vortex chamber.

49. A two-stroke internal-combustion engine according to claim 48, wherein said outlet port is open to the bottom of said vortex chamber.

50. A two-stroke internal-combustion engine according to claim 48, wherein said air-fuel mixture separator comrpises a hollow pipe coaxially arranged in said cylindrical vortex chamber, said outlet passage being formed in said hollow pipe and having an end which is open to said vortex chamber.

51. A two-stroke internal-combustion engine according to claim 48, wherein said air-fuel mixture separator is attached to said cylinder block.

52. A two-stroke internal-combustion engine according to claim 1, wherein said scavenge port comprises an upper edge, a lower edge, a first side edge located near said exhaust port, and a second side edge located remote from said exhaust port and said transfer passage comprises an outer wall connected to said upper edge, an inner wall connected to said lower edge, a first side wall connected to said first side edge and located near said exhaust port, and a second side wall connected to said second side edge and located remote from said exhaust port, said fuel-separating means comprising a curved edge formed on a corner at which said first side edge intersects said upper edge.

53. A two-stroke internal-combustion engine according to claim 52, wherein said curved edge extends over approximately one half of said upper edge and over approximately one half of said first side edge.

54. A two-stroke internal-combustion engine according to claim 52, wherein the first side wall of said transfer passage has a curved wall portion located near said first side edge and curving away from said exhaust port.

55. A two-stroke internal-combustion engine according to claim 54, wherein the second side wall of said transfer passage has a curved wall portion located near said second side edge and curving away from said exhaust port.

56. A two-stroke internal-combustion engine according to claim 52, wherein said scavenge port comprises a plurality of scavenge ports each having said curved edge.

* * * * *